United States Patent
Aridor et al.

(10) Patent No.: US 6,618,737 B2
(45) Date of Patent: Sep. 9, 2003

(54) SPECULATIVE CACHING OF INDIVIDUAL FIELDS IN A DISTRIBUTED OBJECT SYSTEM

(75) Inventors: Yariv Aridor, Haifa (IL); Michael Factor, Haifa (IL); Tamar Eilam, Haifa (IL); Assaf Schuster, Haifa (IL); Avi Teperman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/751,694

(22) Filed: Dec. 29, 2000

(65) Prior Publication Data

US 2002/0038301 A1 Mar. 28, 2002

Related U.S. Application Data

(60) Provisional application No. 60/188,007, filed on Mar. 9, 2000.

(51) Int. Cl.[7] .............................. G06F 17/30; G06F 7/00
(52) U.S. Cl. ........................................ 707/205; 707/101
(58) Field of Search ................................. 707/200–205, 707/101–103; 711/122–128, 141, 144; 709/100–106, 108; 717/106, 116, 154; 712/31, 36

(56) References Cited

PUBLICATIONS

Y. Aridor et al., "cJVM: A Single System Image of a JVM on a Cluster", International Conference on Parallel Processing, Sep. 21–24, 1999, 8 pgs.

S. Porat et al., "Sharpening Global Static Analysis to Cope with Java", Proceedings CA SOON 1998, Nov. 1998, 14 pgs.

Myrinet overview, Aug. 1994, 3 pgs. (http://www.myri.com).

Y. Aridor et al., Transparently Obtaining Scalability for Java Applications on a Cluster:, Journal of Parallel Distributed Computing, Jun. 2000 (to appear in JPDC Special Issue on Java Clusters), pp. 1–35.

J. Baylor et al., "Java Server Benchmarks", IBM System Journal 39(1), Apr. 2000, pp. 57–81.

Y. Aridor et al., "Field–Level Caching in Distributed Object Systems", Sep. 3, 2000, 13 pages.

Copending U.S. application Ser. No. 09/317,421, entitled "Mechanism for Dynamic Selection of an Object Method", filed May 24, 1999.

*Primary Examiner*—Safet Metjahic
*Assistant Examiner*—Te Y Chen
(74) *Attorney, Agent, or Firm*—Darby & Darby

(57) ABSTRACT

This disclosure presents a technique of field-level caching in distributed object-oriented systems, in which a speculative approach is taken to identify opportunities for caching. The speculative approach is particularly suitable for exploitation of opportunities for caching. Invalidation protocols, which are fully compliant with the Java memory model, are provided to recover from incorrect speculation, while incurring only a low overhead. The technique has been implemented on a cluster of machines, and has been found to be readily scalable with multi-threaded applications. Field caching, optionally combined with other optimizations, produces a practically important performance step up in distributed environments, such as the cluster virtual machine for Java, which transparently distributes an application's threads and objects among the nodes of a cluster.

45 Claims, 9 Drawing Sheets

SPECULATIVE CACHING OF INDIVIDUAL FIELDS IN A DISTRIBUTED OBJECT SYSTEM

CROSS-REFERENCE TO RELATED APPLICATIONS

This application claims the benefit of Provisional Application No. 60/188,007, filed Mar. 9, 2000.

BACKGROUND OF THE INVENTION

1. Field of the Invention

This invention relates to improvement in the efficiency of distributed computing systems. More particularly this invention relates to an improved caching technique that reduces the overhead of remote access of distributed objects while preserving coherency, and which permits the local execution of operations on distributed objects.

2. Description of the Related Art

In a distributed computing system caching is a common technique for avoiding overhead for remote accesses. In general, when an object is cached, some sort of coherency protocol is required to ensure that an update on one copy is correctly reflected on all other copies. Often this coherency protocol takes the form of allowing one node to update the object at a time. If objects which are read-only are cached, there are no updates, and thus no need for a coherency protocol. Once an object is cached in a node, operations (method invocations, read and write) on the object can be executed locally. Caching is most effective when used for data that is rarely or never modified.

In many cases objects are mostly or partially read-only in the sense that some subset of the object's fields are read-only. In other cases, objects cannot be proven to be read-only statically, either because there is code that modifies the fields of the object, or not all of the program code is available for static analysis. Sometimes, the execution of code that modified the fields at run time depends on input data. For some input it may never be executed. According to known prior art, for these objects to be cached, and for operations against these objects to be locally executed, one of the following would have been required: (1) the use of a coherency protocol; or (2) the use of explicit hints provided by the programmer as to whether or not it was safe to cache the object.

A Java virtual machine (JVM) is platform-specific, as regards the operating system and the hardware. It is both an operating system and a program that implements a well-defined, platform independent virtual machine. It is an example of an environment suitable for the practice of the present invention. There are currently implementations of Java virtual machines for a range of platforms from embedded systems up to mainframes.

The Java virtual machine is a stack machine whose semantics are given by a set of bytecodes. Code belongs to methods which, in turn, belong to classes. Java and the Java virtual machine are very flexible, allowing classes to be dynamically created by an application, loaded, and then executed in the same application. When executed, the bytecodes change the state of the stack and can mutate objects allocated in a heap. The Java virtual machine supports multiple concurrent threads.

The basic memory model for the data manipulated by a Java virtual machine consists of stacks and a heap. There is a stack for each thread. Each stack consists of a collection of stack frames, one for each method that was invoked and which has not yet returned, where the frame is divided into three areas; parameters, variables and a conventional push-down operand stack.

Objects are allocated on a garbage collected heap via explicit program requests to create a new object. The request to create a new object, places a reference to the object on the top of the stack, enabling the object to be further manipulated.

In addition to the heap and the stack, the Java virtual machine internally uses system memory for various resources, including metadata related to the program's classes, the program's instructions, etc. The metadata associated with a class includes information such as an object representing the class, and information on the class methods, which is maintained in an array of method block structures entries (one for each method), and more. The program's instructions are the bytecodes that make up its methods.

The Java virtual machine bytecodes are conveniently divided into different groups based upon the type of memory they access. Based upon this division, it is possible to gain an understanding of what is required to ensure the correct semantics of the bytecode in a cluster of Java virtual machines.

A large set of bytecodes only accesses the Java stack frame of a currently executing method. For example, bytecodes corresponding to load and store instructions to and from a stack frame, control flow, and arithmetic operations. It is relatively easy to guarantee a single system image for these bytecodes since the code can be replicated and since a stack frame is accessed by only a single thread.

Another group of bytecodes accesses objects in the heap. For example the bytecodes getfield and putfield access a specific object's fields. It is this group that is particularly relevant to the present invention when applied to a distributed object system. If two different nodes access the same object, it is essential that they each see the same values, within the constraints of Java's memory consistency.

The Java virtual machine as a virtual stack machine is powered by an interpreter loop. On each iteration of the loop the next bytecode is executed. The stack is modified as specified by the bytecode, the heap is accessed as appropriate and the program counter is updated. The interpreter loop can be viewed as a giant switch statement, specifying a distinct action for each of the bytecodes.

To enable correct multithreaded operations, Java provides a synchronization mechanism implemented in the Java virtual machine, which allows threads to share and manipulate data correctly. The semantics of the Java memory model are well known, and only a brief description is presented herein.

When a thread executes a synchronized operation it tries to acquire a lock on the specified object. If the lock has already been acquired by another thread, the current thread waits. When the lock is released, one of the waiting threads acquires it and the others remain in a wait state.

A thread may acquire the same lock several times in a row. A thread releases a lock L when the number of unlock operations it performs on the lock L equals the number of lock operations.

The cluster virtual machine for Java is a known implementation of the Java virtual machine, which provides a single system image of a traditional Java virtual machine, while executing in a distributed fashion on the nodes of a cluster. The cluster virtual machine for Java virtualizes the cluster, transparently distributing the objects and threads of any pure Java application. The aim of the cluster virtual machine for Java is to obtain improved scalability for Java server applications by distributing the application's work among the cluster's computing resources. While the existence of the cluster is not visible to a Java application running on top of a cluster virtual machine for Java, the cluster virtual machine for Java is cluster-aware. The implementation distributes the objects and threads created by the application among the nodes of the cluster. In addition, when a thread that is placed on one node wishes to use an object that has been placed upon another node, it is the cluster virtual machine for Java implementation that supports this remote access in a manner that is 100% transparent to the application.

The optimizations incorporated in the cluster virtual machine for Java adhere to Java memory semantics. Relevant components of the architecture of the cluster virtual machine for Java are now described. A full description can be found in the document, cJVM: a Single System Image of a JVM on a Cluster, Y. Aridor, M. Factor and A. Teperman. International Conference on Parallel Processing, Sep. 21–24, 1999.

FIG. 1 shows how a cluster virtual machine for java 10 executes a Java application 12 on a cluster 14. The upper half shows the threads 16 and objects 18 of the application 12 as seen by the program. This is the view presented by a traditional Java virtual machine. The lower half shows the distributed objects 20 and distributed threads 22 of the application 12 transparently distributed as to the application 12 across the nodes 24 of the cluster 14 by the operation of the cluster virtual machine for Java 10.

There is a cluster virtual machine for java process on each cluster node 24, where the collection of processes as a whole constitutes the cluster virtual machine for Java 10. Each of the processes implements a Java interpreter loop while executing part of the distributed threads 22 and containing a portion of the distributed objects 20 that were created by the application 12. More specifically on each of the nodes 24 the cluster virtual machine for Java 10 has a pool of server threads waiting for requests from the other nodes of the cluster 14.

The cluster virtual machine for Java distributes the application's threads using a pluggable load balancing algorithm to determine where to place the newly created thread. The main method is started on an arbitrary node. When the application creates a new thread, the cluster virtual machine for Java determines the best location for it, and sends a request to the selected node to create the thread object. The request is executed by one of the available server threads.

The object model of the cluster virtual machine for Java is composed of master objects and proxies. A master object is the object, as defined by the programmer. The master node for an object is the node where the object's master copy is located. A proxy is a surrogate for a remote object through which that remote object can be accessed. While a proxy is a fundamental concept used in systems supporting location-transparent access to remote objects, the cluster virtual machine for Java pushes the idea one step further. Smart proxies is a novel mechanism which allows multiple proxy implementations for a given class, while the most efficient implementation can be determined on a per object instance basis. Smart proxies are disclosed more fully in U.S. Pat. No. 6,487,714, entitled "Mechanism for Dynamic Selection of an Object Method", filed May 24, 1999.

Smart proxies were motivated by the fact that different proxy implementations of different instances of the same class can improve performance. For example, consider two array objects with different run-time behavior. The first is a final static array, which after being initialized, all the accesses to its elements are read-only. The second array is public, relatively large and accesses are sparse and involve a mixture of read and write operations. It is clear that for the first array a caching proxy, i.e., a proxy where all the elements of the master array are cached, will boost performance, while the elements of the second array should be accessed remotely.

To maintain the single system image the cluster virtual machine for Java must give the application the illusion that it is executing on a traditional Java virtual machine, hiding any distinction between master and proxy from the application.

This challenge has been met by: 1) implementing proxy objects with the same internal representation, e.g. object header, and method tables, as their master objects and 2) having all the proxy implementations coexist within a single class object.

Specifically, the virtual method table of a class is logically extended into an array of virtual method tables 26, as seen in FIG. 2. In addition to the original table of method code, each of the other tables refers to the code for a particular proxy implementation. All the virtual tables and the code for the proxy implementations are created during class loading. In the base implementation of cluster virtual machine for Java, every class has two virtual tables: one for the original method code and one for a simple proxy implementation. The simple proxy is one where all invocations are transferred to the master copy of the object.

Upon creation of a master object 28 or a proxy 30, its method table pointer points to the correct virtual table of its implementation in the array of virtual method tables 26, which distinguishes it from other proxies as well as from the master object of a proxy. This distinction is only visible from within the implementation of the cluster virtual machine for Java; the application cannot distinguish between the master and the proxies. It should be noted that it is possible to change proxy implementations during run-time. A particular set of implementations may allow representation changes during run-time when certain conditions are met, and disallow them if, in the course of execution, these conditions are no longer true. However, at the level of a mechanism, the cluster virtual machine for Java is designed without any such constraints.

With the simple proxy implementation, when a method is invoked on a proxy, the method is shipped to the node holding the object's master. This method shipping results in a distributed spaghetti stack 32 as shown in FIG. 3. As part of this remote invocation, the cluster virtual machine for Java is responsible for transferring any parameters and return values. The data transferred may include objects which are passed using a global address, a preferred format for uniquely identifying objects among nodes. When a node receives a global address it has not previously seen, a proxy for the object is created on the fly.

As described in the previous section, there is a set of bytecodes which accesses the heap. Since a distributed heap is provided, these bytecodes must be modified to work correctly. The cluster virtual machine for Java modifies the implementation of the relevant bytecodes (getfield, putfield, etc.) to be cluster aware. For example the base implementation for getfield checks if the target object is a proxy; if true, it retrieves the data from the remote master.

Just as instance objects have masters and proxies, class objects also have masters and proxies. When the cluster virtual machine for Java loads a class, the code and internal data structures are created on all nodes that use the class. However, the application visible data, i.e., static fields, are used on one node only, which is designated as the master for the class. All accesses to static fields of this class are directed to the master class object.

In cluster enabling the Java virtual machine the issue of locking has been addressed. The cluster virtual machine for Java requires that all locks be obtained and released on the master copy of the object being locked.

Since the bytecodes that access the heap are cluster aware as described above, it is not necessary to ship a method invoked on a proxy to the master. The code can be executed locally and each access to the fields of the proxy will be executed remotely. Thus, remote method shipping in the cluster virtual machine for Java can be viewed as an optimization, possibly replacing many remote accesses with one remote invocation and many local ones. However, there are two kinds of methods that must always be executed at the master: synchronized methods and native methods. As mentioned above, locks are always obtained at the master. Thus synchronized methods are always executed at the master. Native methods must always be executed at the master since they may use native state which is not visible to the cluster virtual machine for Java and which cannot be made available at the proxy's node.

It is clearly desirable to design an efficient proxy implementation while maintaining Java's semantics.

SUMMARY OF THE INVENTION

In some aspects of the present invention a proxy implementation is provided in a distributed computing system, which, with respect to the application, transparently caches individual fields of objects. When applied to Java virtual machines there is a substantial improvement in performance.

The application of some aspects of the invention advantageously provides a proxy implementation in a distributed computing system in which object fields are speculatively identified as candidates for caching.

Furthermore, some aspects of the present invention provide for optimal local execution of methods that access cached fields in a distributed computing system.

Some aspects of the present invention provide for optimal local caching of object fields in a distributed computing system by appropriate invalidation of cached fields throughout nodes of the system.

This disclosure introduces the concept of field-level caching in distributed object-oriented systems, in which a speculative approach is taken to identify opportunities for caching. Speculative approaches have been discovered to be particularly suitable for exploitation of opportunities for caching. Invalidation protocols, which are fully compliant with the Java memory model, are provided to recover from incorrect speculation, while incurring only a low overhead. In some embodiments update protocols may also be used, alone, or in combination with invalidation protocols. The technique has been implemented on a cluster of machines, and has been found to be readily scalable with multithreaded applications. Field caching, optionally combined with other optimizations produces a practically important performance step up in distributed environments, such as the cluster virtual machine for Java, which transparently distributes an application's threads and objects among the nodes of a cluster.

According to some aspects of the invention speculation is used to cache only those fields which are "read-only in practice" or "mostly-read-only in practice", as these terms are defined hereinbelow. An invalidation protocol is used at the level of the class in the event of an incorrect speculation. The mechanism has been realized in the cluster virtual machine for Java. The caching technique is an essential component in obtaining scalability, and in the context of the cluster virtual machine for Java, efficiency levels in excess of 85% efficiency have been obtained for applications which are cluster-unaware using the caching technique in conjunction with other optimizations.

The invention provides a method of distributed computing, comprising the steps of executing threads of an application in a plurality of interconnected nodes in a network, allocating memory of the nodes to data objects, responsive to the memory allocation for one of the data objects, applying a predefined set of criteria to individual fields of the one data object, selecting read-locally fields from the individual fields according to the predefined set of criteria, and caching the read-locally fields in a cache of at least one of the nodes. Performance of the caching is transparent to the application. The method further includes fetching at least one of the cached instances of the read-locally fields from the cache during execution of one of the threads by a proxy that is associated with the cache.

According to an aspect of the invention, the step of selecting is performed by initializing the individual fields, and speculatively applying the predefined set of criteria prior to the caching and fetching.

According to a further aspect of the invention, the predefined set of criteria includes field encapsulation in a code of the application or a library code used by the application.

According to a further aspect of the invention, the predefined set of criteria includes a programmer-provided indication.

According to yet another aspect of the invention, a candidate is selected from the individual fields according to a subset of the predefined set of criteria.

An aspect of the invention includes mutating one of the cached instances in one of the nodes, and responsive to the mutation, invalidating all of the cached instances of the one cached field.

In an additional aspect of the invention, the method includes, following the step of invalidating, modifying one of the individual fields, the individual field corresponding to a cached field in a master node, notifying the nodes of the modification, referencing the invalidated cache field in a referencing node, and thereafter transmitting the modified individual field from the master node to the referencing node.

Still another aspect of the invention includes identifying a method of the application that accesses read-locally fields of the data objects to define a locally executable method, executing the locally executable method on one of the nodes, wherein the read-locally fields that are accessed by the locally executable method are fetched from the cache of the individual node.

An additional aspect of the invention includes mutating one of the read-locally fields that is accessed by the locally executable method, and responsive to the step of mutating, invalidating all the cached instances of the one read-locally field, and invalidating the locally executable method, wherein the invalidated method subsequently executes on the master node of the object involved.

According to another aspect of the invention, the data objects comprise a class that has objects allocated in one of the nodes, and the method further includes mutating one of the read-locally fields in one of the objects of the class, and, responsive to the step of mutating, invalidating all of the read-locally fields of all of the objects of the class in the individual node.

According to a further aspect of the Invention, the data objects comprise a class that has objects allocated in one of the nodes, and the method includes the steps of mutating one of the read-locally fields in one of the objects of the class, and, responsive to the step of mutating, invalidating the one read-locally field in all of the objects of the class in the one node.

According to yet another aspect of the invention, execution of the threads of the application is performed using a Java virtual machine. The Java virtual machine may be a cluster virtual machine for Java.

The invention provides a computer software product, comprising a computer-readable medium in which computer program instructions are stored, which instructions, when read by a computer, cause the computer to perform the steps of executing threads of an application on a plurality of interconnected nodes in a network, allocating memory of the nodes to data objects, responsive to the step of allocating memory for one of the data objects, applying a predefined set of criteria to individual fields of the one data object, selecting read-locally fields from the individual fields according to the predefined set of criteria, caching the read-locally fields in a cache of at least one of the nodes to define cached instances of the read-locally fields, wherein performance of the step of caching is transparent to the application, and fetching at least one of the cached instances of the read-locally fields from the cache during execution of one of the threads by a proxy that is associated with the cache. The invention provides a distributed computing system, comprising a plurality of processing units interconnected in a network, a runtime support program installed in at least one of the processing units and directing the processing units, wherein the processing units execute threads of an application, and responsive to program instructions of the application, the runtime support program transparently causes the processing units to execute the steps of allocating a portion of a memory to a data object, responsive to the step of allocating, applying a predefined set of criteria to individual fields of the data object, selecting read-locally fields from the individual fields according to the predefined set of criteria, caching the read-locally fields in a cache of at least one of the processing units to define cached instances of the read-locally fields, and fetching at least one of the cached instances of the read-locally fields from the cache during execution of one of the threads by the one processing unit.

BRIEF DESCRIPTION OF THE DRAWINGS

For a better understanding of these and other advantages of the present invention, reference is made to the detailed description of the invention, by way of example, which is to be read in conjunction with the following drawings, wherein.

DESCRIPTION OF THE PREFERRED EMBODIMENT

Figure 1:
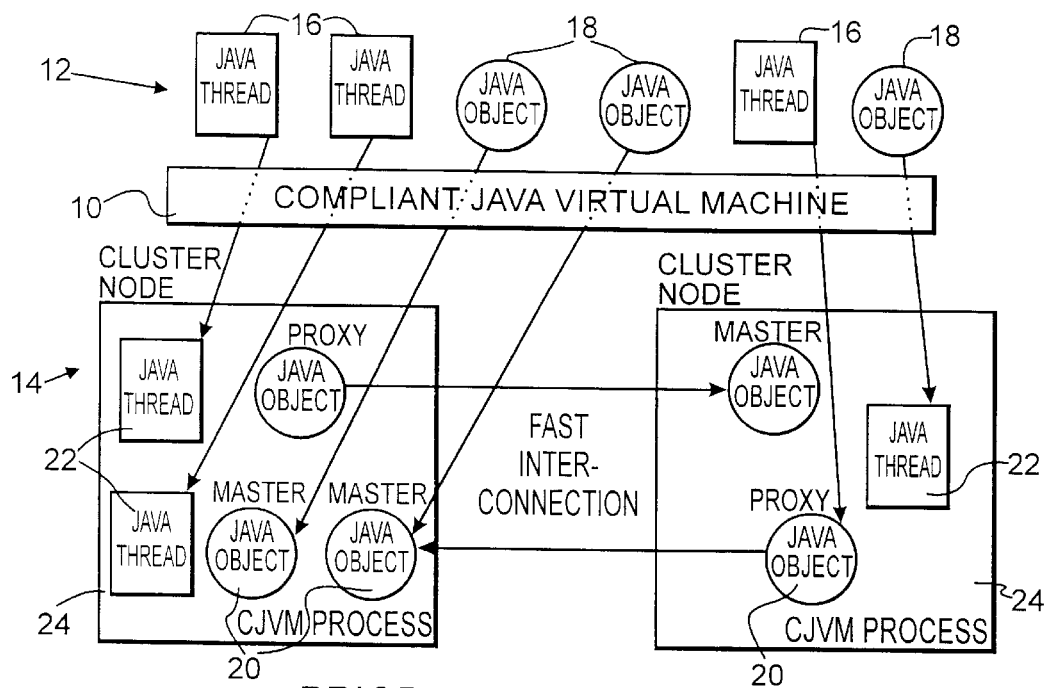
FIG. 1 is a block diagram illustrating execution of a Java application on a cluster virtual machine for Java according to the prior art.
Figure 2:
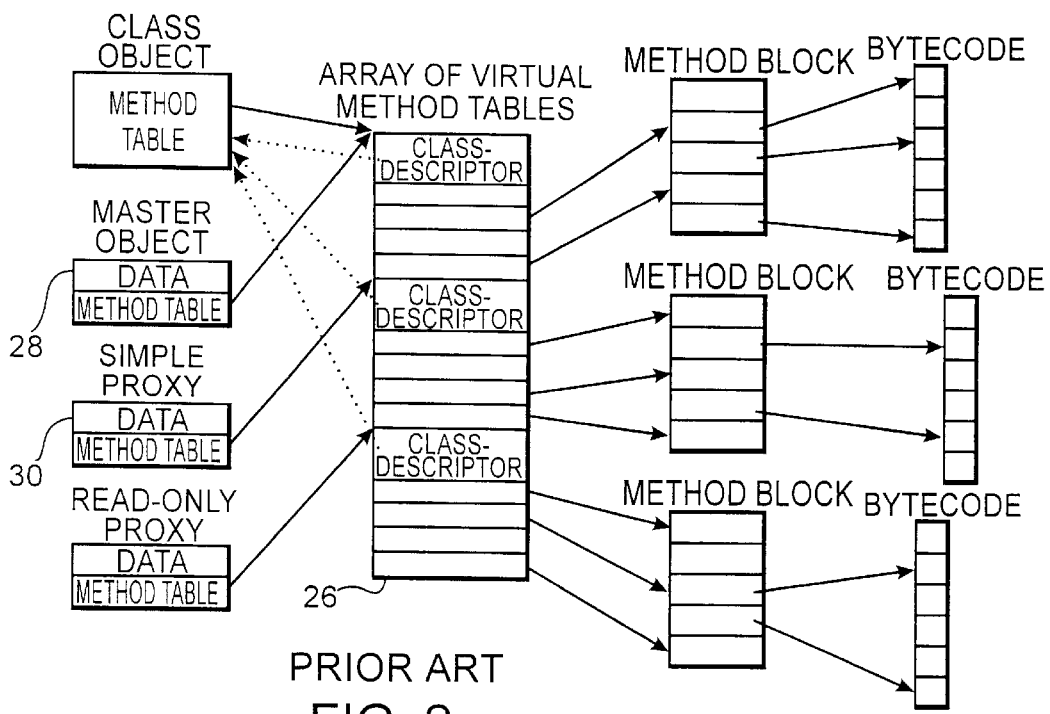
FIG. 2 is a diagram of a virtual method table of a class which is logically extended into an array of virtual method tables according to the prior art.
Figure 3:
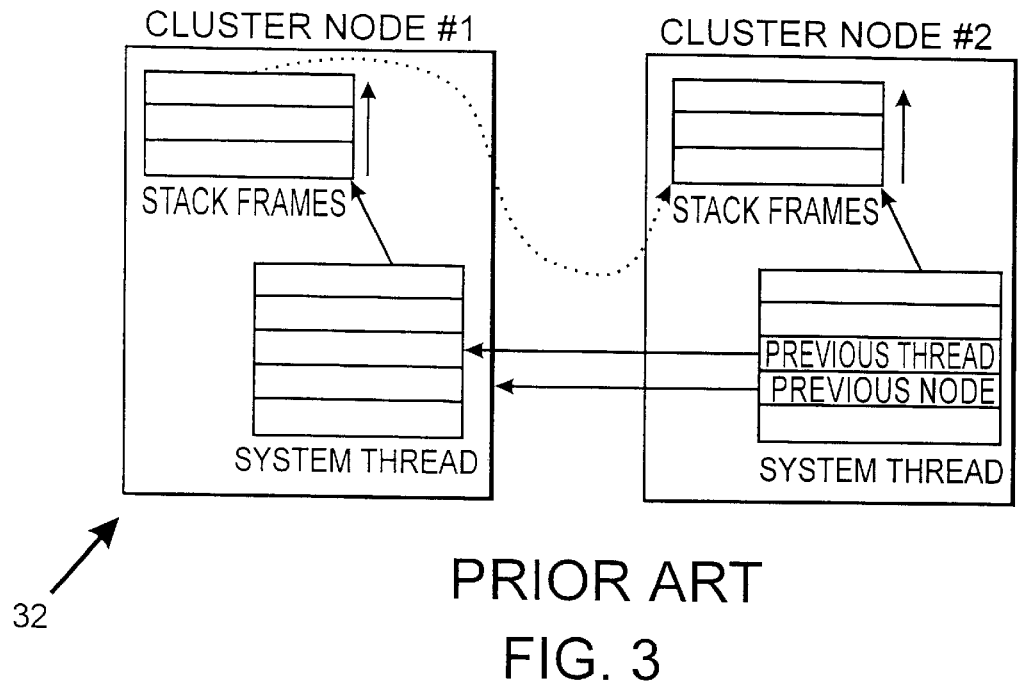
FIG. 3 illustrates the formation of a distributed spaghetti stack when a method is invoked on a proxy according to the prior art.

In the following description, numerous specific details are set forth in order to provide a thorough understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

Definitions

The following definitions and usages apply to this disclosure:

Fields which are potentially read only are called "read-locally". Methods which do not write to any field and read only values of read-locally fields are called "locally executable methods". These read-locally fields are herein referred to as the "read-locally field set" of the method.

A field in a class is invalidated if it loses its read-locally status. A locally executable method is invalidated (looses its locally executable status) when any field in its read-locally field set is invalidated.

A field is "currently read-locally" if it is read-locally field of a class which is not validated. A "read-only in practice field" is one that has been speculatively identified following initialization as being immutable. More precisely, read-only in practice fields are fields which in a particular run of the program are not modified after the object containing the field has at least one proxy.

A field is "mostly-read-only in practice" if the number of writes to the field is significantly lower than the number of reads, after the field is accessed on multiple nodes.

A class is termed a "read-locally class" if it, or any of its super classes, contain read-locally fields.

Dependent method list. Each read-locally field has a list of locally-executable methods which read the field. This list is called the field's "dependent method list." In mathematical terms this list is the inverse of the read-locally fields set defined above.

The term "serialization" describes the process of packing objects fields for shipping to another node and "deserialization" describes the process of unpacking and setting the fields of the (proxy) object in the new node. Note that this is not the standard Java serialization.

A "read-only object" is an object whose fields are never changed after the object is instantiated. Objects of type java/lang/String and java/lang/Integer are examples of such objects.

A "master object" is an object created specifically by the application.

The "master node" of an object is the node in the cluster where the master object is created.

A "proxy object" is a surrogate of the master object on a node which is not a master node.

An "encapsulated array" is one that is accessed only by code of its containing instance. "Java" refers to the language, Java™, from Sun Micro-systems, Inc.

A "stateless method" is a method which works only on the local thread's stack and possibly invokes other methods. It does do not mutate the heap.

Overview

The optimizations of the cluster virtual machine for Java disclosed herein focus on reducing the quantity of communication by enhancing data locality. Generally optimizations can be classified as those which use caching techniques, those that attempt to optimize where a method is invoked; and those that attempt to optimize the placement of objects. This disclosure deals principally with the first category.

Figure 4:
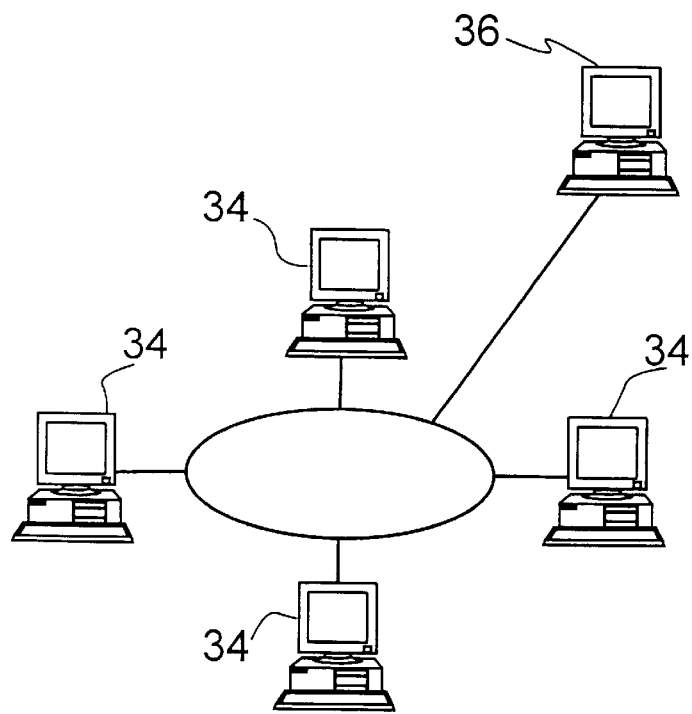
FIG. 4 is a schematic diagram of a computer system arranged to operate in accordance with the teachings of the present invention.

Referring now to FIG. 4, the cluster virtual machine for Java is realized on a plurality of processing stations 34, which are interconnected as nodes in a network. The network can be an internet, a private network, such as a local area network or wide area network, or a cluster of co-located processing units connected via a bus. Such arrangements are well known to the art, and will not be described further herein. In accordance with the known operation of the cluster virtual machine for Java, for a given application, preferably a Java application, a particular processing station 36, can host a master object of a class, and others of the processing stations 34 can be assigned to function as host for proxies of that object. The cluster virtual machine for Java is flexible in its ability to arrange thread execution for optimal performance among the processing stations 34, 36. The runtime support software of the cluster virtual machine for Java as modified herein according to preferred embodiment of the invention is provided as a computer software product on any suitable medium, for installation on at least one of the processing stations 34, 36. The software may optionally be downloaded to the other processing stations as required.

The caching techniques presented herein focus on data which is not mutated during a given program execution. Data is considered at the level of classes, objects and even individual object fields. These caching optimizations can provide even greater performance benefit when used in concert with invocation optimizations. The caching optimizations are almost all speculative. They utilize knowledge of Java semantics, e.g., the heap accesses performed by a method, and data usage patterns. For example the optimizations rely on the typical usage of static data. Information is extracted by analyzing the bytecodes during class loading to determine which optimization to apply on which datum. To handle cases where a heuristics decision was incorrect, the optimizations are augmented by invalidation protocols. The alternative of update-based protocols is not preferred, because (1) there is a large overhead of update-based schemes compared with invalidation-based ones; and (2) the repetitive nature of certain applications, particularly Java applications such as concurrent daemons, implies that once a datum is accessed in such a way that it conflicts with an optimization, it will continue to be accessed in the same way. In addition, it is necessary to exercise care in the design or invalidation protocols such that the number of invalidations required has a worst case bound that is a function of the size of the code, independent of the number of objects created at run-time. Because the number of invalidations is bounded by the size of the code, the amortized cost for invalidation approaches zero, the longer the program executes.

The optimizations herein follow a sequential consistency memory model which is more conservative than the memory model required by Java. Thus, they maintain the cluster virtual machine for Java as a standard Java virtual machine, providing a single system image on a cluster. Moreover, this memory model makes the optimizations simple to implement while their correctness can be easily validated.

To provide an idea of the maximal impact of each optimization, a set of micro-benchmarks has been devised. While in real applications, the effect of each optimization depends on the behavior of the application and its input data, these micro-benchmarks isolate their effects. The benchmarks contain a tight loop in which they perform the relevant Java operation: access to (1) a static field, (2) an array referenced by a static field, (3) a field of a read-only object, (4) invoking a static method that reads a static integer field, and (5) invoking the stateless method, java.lang.Math.min. The total amount of time to execute this loop is measured and divided by the number of iterations to get the amortized cost per operation. Knowledge of the cluster virtual machine for Java is employed to arrange the threads of the application such that it is possible to measure both local and remote accesses.

Table 1 summarizes the results. These results attempt to quantify the impacts of the caching and invocation optimizations. The benchmarks were run on a two-node cluster. The results show the average time in microseconds required per listed operation, for each optimization: the performance when every remote operation is shipped to the master object (termed Naive Remote), the performance when caching is used (termed Smart Remote) and the performance when running the benchmarks on a single node, i.e., all operations are local. As can be seen from Table 1, the optimizations are effective in reducing the time of a naive remote operation to almost the cost of a local operation.

TABLE 1

| | Optimization | Naive Remote | Smart Remote | Local |
|---|---|---|---|---|
| 1 | Caching static fields | 299.35 | 6.36 | 2.53 |
| 2 | Caching static array | 347.81 | 5.0 | 3.22 |
| 3 | Caching Read-only objects | 158.75 | 6.28 | 2.34 |
| 4 | Caching Read-only in practice fields | 442.03 | 7.57 | 3.62 |
| 5 | Invoke static methods | 301.57 | 6.31 | 4.22 |
| 6 | Invoke stateless methods | 315.47 | 10.98 | 8.63 |

Cache-based Optimizations

Good performance requires caching at multiple levels of granularity. Thus, the cluster virtual machine for Java supports caching at the level of classes, entire objects, and individual fields. Class level caching according to a preferred embodiment of the invention focuses on caching static fields. Two mechanisms are disclosed for caching entire objects: one focuses on caching all instances of read-only classes and the other focuses on caching specific instances of arrays for which there is a priori reason to believe will not be mutated. Caching of individual fields is approached by speculating that certain fields will not be mutated, and caching those fields in all instances of a given class. It is intended that nodes of the cluster locally access any data which is not mutated. Although in an environment such as Java, where new classes can be created and loaded on-the-fly, it is often impossible to prove that a field is immutable, it is nevertheless practical to make speculative decisions that a particular datum will not be mutated. To handle the case where the speculation was incorrect, the caching optimizations are augmented by invalidation schemes.

Maintaining Java Memory Model

Before disclosing the techniques of caching, it will be useful to explain how the memory model of the Java virtual machine is maintained by the cluster virtual machine for Java in the preferred embodiment of the invention.

Since the cluster virtual machine for Java presents a single system image of a Java virtual machine, its memory model must comply with the Java memory model as defined in the Java virtual machine specification. In particular, it is known that the Java memory model requires coherence and some variant of causality for regular, non-volatile variables.

The cluster virtual machine for Java ensures that the Java memory model is not violated by supporting the stronger memory model of sequential consistency. Informally stated, all threads view the same order of modifications to all fields. This is a design choice which is meant to avoid the high penalty other systems pay for the complex protocols needed to realize a relaxed consistency. However, without smart caching protocols, sequential consistency may doom scalability by forcing immediate remote updates, resulting in extensive communication. The cluster virtual machine for Java circumvents this problem, achieving locality of memory reference, through two main mechanisms (1) the optimistic, speculative field-level caching as disclosed herein, and (2) the adoption of object-level caching protocols to the semantics of the language and the observed usage patterns. As shown below, this strategy has proved to be successful.

Another type of variable which may be used by the applications running on top of the cluster virtual machine for Java is volatile. The Java memory model defines sequential consistency for volatile variables. The Java memory model is maintained for volatile variables in the cluster virtual machine for Java by treating them as regular variables.

For synchronized blocks the Java memory model definitions resemble release consistency. Intuitively, all modifications that were performed before a given unlock by a certain thread become known to all other threads which perform subsequent lock operations. This Java memory model constraint holds for the protocols employed by cluster virtual machine for Java in the preferred embodiment of the invention.

Finally it is important to verify that the atomicity of modifications as defined for the Java memory model is preserved as well. The Java memory model guarantees atomicity for modifications at the granularity of 4-byte words. In general, this requirement is kept by the cluster virtual machine for Java through the mechanisms of the Java virtual machine that was elected as the code-base for the cluster virtual machine for Java.

Class Level Caching

Static variables represent data ranging from constants to references to composite data structures which are shared by the class instances and possibly by instances of other classes. They are read and modified by the bytecodes getstatic and putstatic, respectively. The base implementation of the cluster virtual machine for Java performs a remote access when these bytecodes are executed on a node containing a proxy for a static field's class.

In many applications, static fields are usually set once, often by class initialization code which is executed once during class loading, and read many times. Consider, for example, the following class definition where the hash table is modified via the class's methods. However, the reference to it, saved in the static variable table, is never modified.

Consequently, the cluster virtual machine for Java can benefit from caching static variables in their class proxies. A node caches a static field the first time it makes a remote access to that field. When the master for a class receives a remote request to retrieve the value of one of the class's fields, it records the fact that the field is being cached, and which node is doing the caching. Subsequent getstatic operations on this field will be executed locally, as shown in the following code fragment.

Listing 1
```
class c {
public static Hashtable table = new Hashtable();
public c() { // empty constructor.
}
// the rest of the methods update the hashtable
// referred by the table static variable
}
```

If a cached static variable is updated, all its replicas must be either invalidated or updated. In the cluster virtual machine for Java, invalidation was chosen: the replicas of the static variable are invalidated after which all successive putstatic and getstatic operations on the variable are directed to the node containing the master class object.

The invalidation protocol is explained with reference to the following pseudocode fragments.

The pseudocode of Listing 2 executes on the node where putstatic is executed.

```
                            Listing 2
interpreter loop () {
switch (bytecode) {
case putstatic:
send message to apply putstatic of field id on the
master node;
message does not return until the master invalidated
all replicas and perform the update;
break;
}
}
```

On the master node the following pseudocode executes.

```
                            Listing 3
handle putstatic(senderNode, field id, value) {
invalidate local copy of v;
for ( < all nodes having replicas > ) {
    send {invalidate, < node >, field_id};
    wait for {ack} messages;
}
set field_id to value;
send {ack}to senderNode;
}
```

The pseudocode of Listing 4 executes on a node having a replica of the static variable.

```
                            Listing 4
handle invalidate message (senderNode,field_id) {
if (not < already uncached > ) {
    invalidate local copy of field_id;
}
send {ack} message to senderNode;
return;
}
```

Once a putstatic operation on a static variable is detected, the current node sends a message to the master node of the corresponding class to set the field's value. The master node sends an invalidate message to the nodes holding replicas of the variable. Each node invalidates its copy, after which it returns an ack message to the master node.

Upon accepting all the ack messages, the master node sets the field's value and sends a final ack message to the node which originated the invalidation process. Once this final ack is received, the execution continues with the bytecode following the putstatic. The new value is not written until all the replicas are invalidated.

As described above, a master node knows all nodes having replicas of a static field, since the way to initially get the value of a static variable is to execute a remote getstatic operation at the master node. Instead of tracking which nodes hold replicas of a static field for purposes of invalidation, the cluster virtual machine for Java could simply send the invalidate message to all nodes. There is an obvious tradeoff between the number of invalidation messages and the amount of space required to track replicas which is a function of the cluster size. The appropriate alternative also depends upon whether the communication layer supports an efficient broadcast message or not.

In the currently preferred embodiment, the first alternative has been implemented. However in some embodiments the second alternative can be utilized with minimum impact. In both alternatives, in the worst case, the quantity of invalidation messages is linear as to the number of static variables which itself is linear with respect to the size of the code, irrespective of the number of objects created at run-time. In addition, the length of the maximal communication path is O(1). Invalidate messages do not travel farther than a single hop. This is optimal as it requires no more than O(1) messages per cached copy of a field.

The invalidation mechanism is deadlock-free since handling an invalidate message never blocks on any events related to the cluster virtual machine for Java, e.g., waiting for replies to remote messages. Each node eventually sends its ack message, and the master will finally receive all the acks, thereby completing the invalidation.

Since the invalidation is internal to the putstatic bytecode, it preserves Java's memory model, as shown more specifically in Listings 2–4. Invalidation is triggered at the master node when there is a request to modify the field. All putstatic operations are applied only on the master node. Putstatic operations are applied after their corresponding invalidation processes have completed. The invalidation process is applied atomically with respect to other accesses to the same field as part of the corresponding putstatic bytecode. Consequently, the invalidation process does not introduce any interleaving of the instruction streams. Such interleaving is not permitted to occur in a traditional Java virtual machine. Thus, the invalidation process complies with the Java virtual machine memory model semantics.

Row 1 (caching static fields) of Table 1 shows the impact of this optimization in a micro-benchmark. The optimization results in a roughly 50-fold saving over a remote invocation. This saving is attributed solely from the fact that the optimization eliminates remote interactions.

Object Level Caching

As mentioned above there are two different approaches to caching entire objects. In the first, all instances belonging to classes whose instances are read-only are cached. In the second, selected arrays reachable from static final variables are cached, as these arrays tend to not be mutated.

Caching of Read-only Objects

Currently, the cluster virtual machine for Java supports caching of read-only objects for a collection of core Java classes which are known a priori to be read-only. When a read-only object is passed to a node, the cluster virtual machine for Java creates a special proxy for it, a read-only proxy. The cluster virtual machine for Java handles creation of read-only proxies as follows. First, the object is allocated and the values of the object's fields, which are passed in a message either from the master or from another read-only proxy, are stored in their respective slots. Next, the cluster virtual machine for Java sets the method table pointer for this instance to take advantage of the fact that this is a read-only object. Then, the cluster virtual machine for Java tags the proxy as Read-only, which directs the field access operations to be executed locally. Once this is done, the cluster virtual machine for Java passes the reference to the object to the application code. Thereafter, all application accesses to fields of the objects are local. The impact of this optimization is shown by the micro-benchmark presented in row 3 of Table 1. Since this optimization is only applied to objects which are provably read-only, there is no need for either an update or invalidation protocol. Caching of instance data where it cannot be proven with 100% certainty that the object is immutable is disclosed below.

Caching of Final Static Arrays

Above, an approach was described in which certain classes were identified whose instances can always be cached. In this section, a technique of caching entire objects is disclosed, where the determination to cache a specific object depends upon the usage of the given object. This usage is determined based upon an understanding of the semantics of Java bytecodes, combined with an observation of common usage patterns of the Java language.

A field declared as final in Java is a field whose value never changes. Strictly speaking, the semantics of a field containing a Java array declared as final is that the reference to the array never changes, but the array elements can be modified. However, in practice, when used for arrays referenced from static fields, such language constructs are almost always used as an array whose elements never change.

The caching mechanism for static fields described above caches the value of the reference to the array; it does not, however, cache the contents of the array. The observation that in practice the contents of the array are often not mutated led us to implement a caching mechanism for such arrays. As with static fields, an invalidation-based protocol is used for those cases where there is a write operation to one of the array elements.

As shown in Table 1, the amortized cost of accessing a cached copy of an array is less than double the cost of accessing a local array. Thus, when viewed in isolation, this is obviously a good optimization.

The caching mechanism for static final arrays contains three components: (1) identifying arrays which should be cached; (2) caching the contents of the array on demand; and (3) invalidating the cache if there is an attempt to modify the array.

At the time a class is initialized those arrays that should be cached are identified. The static final reference to the array is initialized as part of class initialization on the master node of the class. This reference is set by executing a putstatic bytecode. As part of the cluster virtual machine for Java implementation of putstatic, it is determined whether the reference to an array in a final field is being stored. If so, the array is marked as cacheable.

When a node receives a global address for a cacheable array and creates a new proxy for the array, the node requests the array's contents. This request is sent to the node that sent the global address. Alternatively, the contents of the array can always be requested from the master of the class; however, this could lead to the master becoming a bottleneck, particularly if the arrays are large. After the node receives the contents of the array, all future read accesses by this node to the array will be local.

Since it cannot be assured that a cached array will not be modified, it is necessary to be prepared to handle stores to the array. As with static fields, it is possible to use either an update protocol or an invalidation protocol. An invalidation protocol is preferred, since once there is a single store to an array, given the repetitive nature of Java server applications, there is a high likelihood that there will be additional stores, leading to heavy overhead for an update-based protocol.

Invalidation Protocol

In the preferred embodiment of the invention the invalidation protocol involves the following steps:

1. When a store is executed against a cached array, the node executing the store sends an invalidation request to the master node of the array as part of the store operation.

2. The master node broadcasts the invalidation request to all nodes and marks the master copy of the array as non-cacheable and non-cached.

3. When a node receives an invalidation request, it changes the indicated array to a non-cached proxy and sends an acknowledgement.

4. When the master receives acknowledgments from all of the nodes, it updates the array element and sends an acknowledgement to the node that is executing the store.

5. The node executing the store continues to execute the next bytecode.

The fact that the executing thread waits until the field is invalidated in all copies of the class implies that the Java memory consistency model is satisfied.

This protocol is very similar to the one used for static fields, which is disclosed hereinbelow. The main distinction is the fact that the invalidation request are sent to all nodes. The use of the broadcast technique stems from the fact that unlike the case of invalidation of static fields, here the master does not know where the array is cached. The reference to an array, or any object for that matter, can be passed between any two nodes, even if neither node is the master for the object. This makes it difficult to get a global view of all nodes containing copies of the array. The value of a static field, however, is only obtained from the master of the field's class. This distinction points out a general difficulty with distributed object systems—knowing the location of all copies of an object. This issue is avoided in the preferred embodiment of the invention by using global invalidation protocols. The number of times the global invalidation protocols are executed is bounded by the size of the code.

Field Level Caching

The caching approaches described above are coarsely granular. They apply either to a class or to an entire object. However, there exists data that are, in a practical sense, immutable at a finer level of granularity: namely, individual fields of objects.

The granularity of invalidation is an important design consideration. Invalidation is required when a speculation turns out to be incorrect. In such a case all nodes which are caching the datum or field must be notified to ensure consistent behavior. If this invalidation were performed on an instance-by-instance basis, significant overhead would be incurred. However, if the application is designed according to object-oriented principles, the usage pattern of a field defined in a particular class will typically be the same for all instances of that class. Thus, if at runtime it is determined that a particular field in a given instance is heavily mutated, it is likely that the field will be heavily mutated in other instances of the same class. For this reason the caching for this specific field is invalidated in all instances. Since the invalidation is applied on the level of the class, the incurred overhead for invalidation is limited by the code size and is independent of the number of instances of the application's classes.

This section discloses a method to reduce the quantity of inter-node communication by identifying read-only in practice fields. Clearly, read-only in practice fields can be cached in a proxy, such that getfield operations can be locally executed. The definition of a read-only in practice field given in the definition section of this disclosure reflects real programs and integrates well with a distributed object system.

It reflects real programs since it is much less restrictive than a code-based mutability analysis. A code-based analysis reports a field as mutable if there is reachable code that mutates the field, even if this code is never executed during a given program run. In addition, in a language such as Java, which allows dynamic loading of code, if code loaded in the future is able to mutate the field, the code-based analysis reports the field as mutable.

In a distributed object system, what is important is not whether an object is mutated, but rather whether an object is mutated after it is cached. As long as an object is used only by threads on a single node, the presence of mutations is irrelevant to caching.

Fields in read-only objects may be viewed as a special case of read-only in practice fields. However, because of the difference in granularity, the cluster virtual machine for Java uses a different mechanism to deal with read-only objects. Read-only objects are handled at a larger granularity of objects, reducing the overhead involved. But this mechanism provides no benefit unless the entire object is read-only. Read-only in practice field caching incurs more overhead if all of an object's fields are cached; however, it can provide benefit for individual non-mutated fields, even when these fields are contained in objects that are written many times.

A field that is read-only in practice is considered read-locally. The cluster virtual machine for Java speculatively marks all non-static, private fields (except those belonging to read-only objects) as read-locally when a class is loaded. Non-private fields are not included, because these fields can be accessed by other classes, and thus have a greater likelihood of being modified than private fields. A read-locally field which is modified after it is cached is invalidated, losing its read-locally status.

The cluster virtual machine for Java employs a per field, per class approach to invalidate a field which was previously read-locally. This means that caching of the specific field in all instances of the class is invalidated, while other fields in the instance retain their read-locally status. This approach is consistent with object-oriented programming methodology which encourages a programmer to write code that identically treats all instances of a class. Thus, if one of the fields in a certain instance is mutated, it is highly likely that it will also be mutated in other instances. This is especially true for repetitive applications, such as Java server applications. Using this approach, only minimal storage is required to support this optimization. In each class a record is maintained of those fields that are currently read-locally.

When a proxy of an object containing read-locally fields is created, it is not immediately attempted to get the values of the fields. Rather, on the first attempt to access a read-locally field from a proxy, a message is sent to the master node for the object, asking for the values of the object's read-locally fields. A lazy, pull algorithm is used to get the read-locally fields since the number of proxies which contain read-locally fields is bounded only by the number of objects created at run-time. Since many of these proxies may never have their contents accessed, it makes sense to obtain their contents only upon demand. Special care has to be taken in setting the data for read-locally fields since this set might change dynamically.

The lazy, pull algorithm can be briefly described with reference to an object O containing read-only in practice, or mostly-read-only in practice fields. Initially, a node N which is not the master of the object O does not hold a copy of the object O. At the first access to a read-only in practice or mostly-read-only in practice field of the object O, the node N sends out a request message to the master node for a copy of all cacheable fields of the object O. The master node replies with an update message which contains all read-only in practice or mostly-read-only in practice fields in object O.

There may he races between concurrent invalidation protocol and lazy-pull requests. Maintaining a consistent view of modification sequences in such cases is done by an invalidation-aware first-in-first-out ("FIFO") protocol, which is described hereinbelow.

A read-locally field in a class is invalidated when a putfield for this field is executed in one of the instances of the class that has a proxy. The invalidation protocol must guarantee that the field is invalidated in all instances (master and proxy) of the class, while guaranteeing that the memory model of Java is respected. The invalidation process for a field that is read-only in practice is very similar to the protocol for static fields as shown in Listings 2–4.

The invalidation process contains two phases. In the first phase a message is sent to the master class object. The node where the master class object is located then sends an invalidation request to all nodes. In this case the invalidation request must be sent to all nodes, since it is not known which nodes have instances of the indicated class and the message must be handled by all nodes which have used the class. As with static fields, to preserve Java's memory consistency model, the invalidation process is included in the code of putfield. Namely, a putfield that initiates an invalidation is not complete until the field is invalidated in all the nodes, and the new value of the field is written in the master instance object.

Implementation of Field Level Caching

Figure 5:
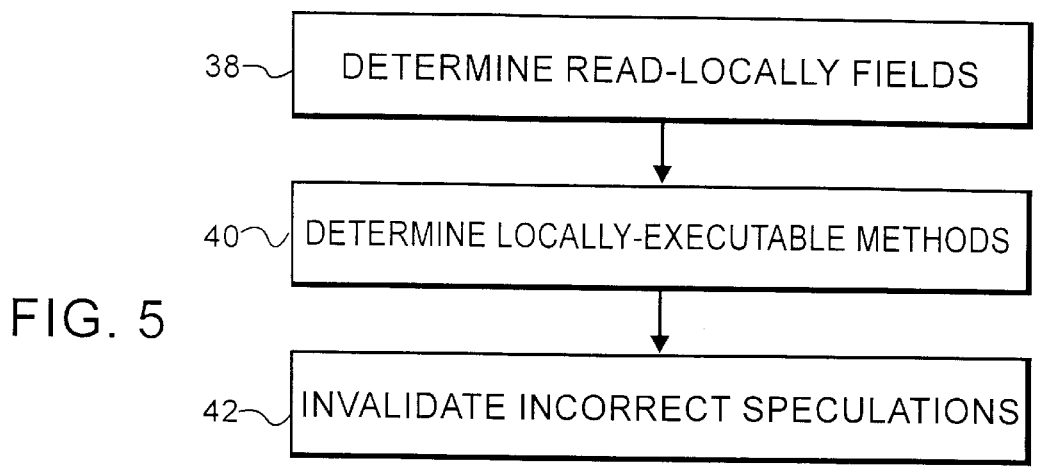
FIG. 5 is a high level flow chart illustrating the cache-based optimization according to a preferred embodiment of the invention.

In a preferred embodiment of the invention, the cache-based optimization is outlined at a high level in the flow chart of FIG. 5. The solution is composed of the following parts. At initial step 38 an identification is made of fields, which potentially are read-locally. Then at step 40 a determination of methods that are locally executable is carried out. Finally at step 42 a run-time mechanism is provided, which supports this optimization and invalidates any incorrect speculation.

Figure 6:
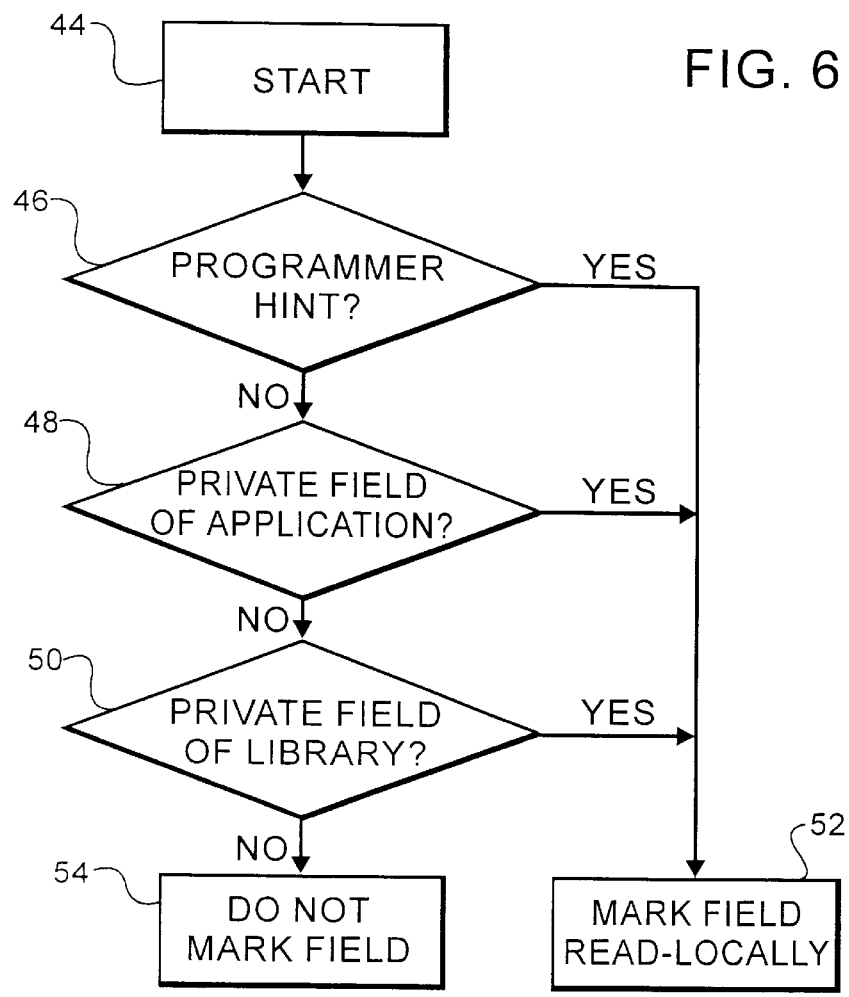
FIG. 6 is a detailed flow chart demonstrating the step of selection of read-locally fields according to FIG. 5.

Fields can be chosen as candidates for caching either by a hint from the programmer, e.g., via a configuration file, or by analysis performed either statically or at run time. The analysis is not aimed at proving a field is read only, but at identifying its potential as being such. Referring to FIG. 6, step 38 is shown in greater detail. While a particular order of identifying and marking fields as read-locally is indicated in FIG. 6, this is merely exemplary, any many variations in the sequence of the steps will occur to those skilled in the art.

The procedure begins at initial step 44. At decision step 46 a check is made to see if a field under consideration appears in a configuration file supplied by the programmer. If so, then the field is marked as read-locally. Otherwise control proceeds to decision step 48, where it is determined if the field under consideration is a field of an application class which can be accessed only from within the class itself. In other words, the field is encapsulated within the class and is not explicitly exposed to other classes. In Java, such fields are private fields. If the field is private, it is marked as read-locally. Otherwise, at decision step 50 a test is made to determine if it is a field of a library classes which can be accessed only from within the class itself. If so the field is marked as read-locally at step 52. Otherwise it is rejected as a candidate at step 54.

Figure 7:
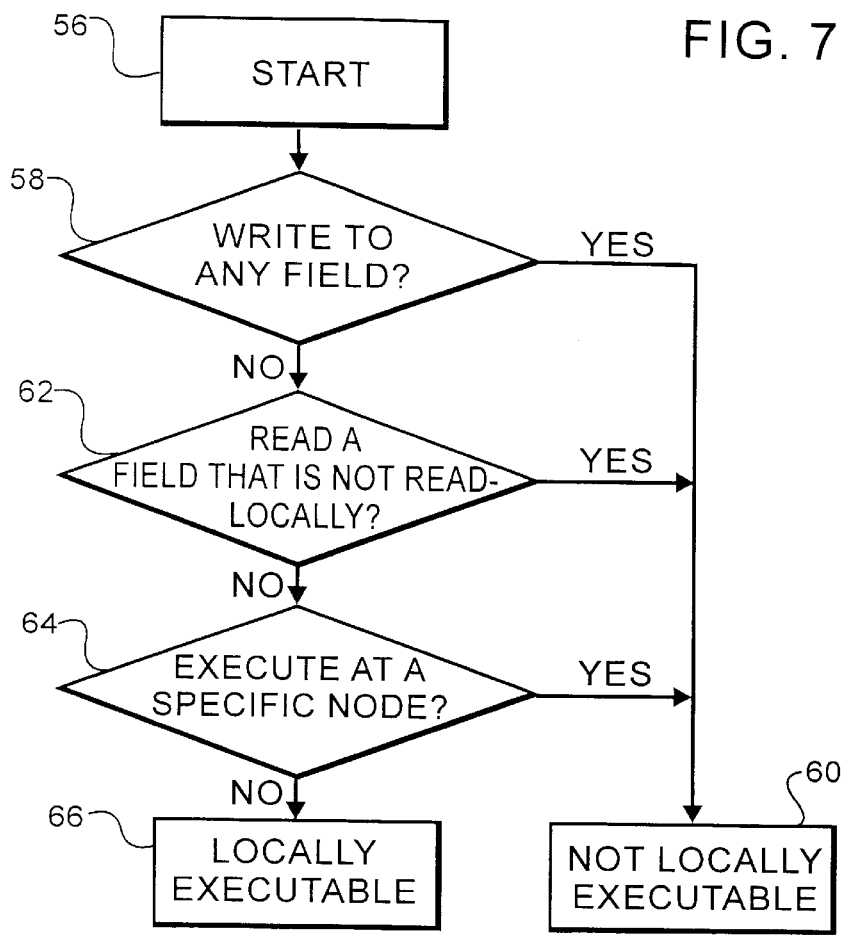
FIG. 7 is a detailed flow chart demonstrating the step of determining locally executable methods according to FIG. 5.

The determination of locally executable methods is done based on the method's use of fields as illustrated in FIG. 7.

A method is locally executable with respect to a set of read-locally fields candidates if and only if the following conditions are satisfied, beginning at step 56. At decision step 58 it is determined if the method writes to any field. This field may or may not be restricted to a particular target object. If a candidate field is written to, the candidate method is rejected as a locally executable method at step 60. If none of the fields is written to, then control passes to decision step 62. Here it is determined if the candidate method reads a field which is not read-locally, again possibly restricted to the target object. If such a field is read by the candidate method, then the candidate method is rejected as a locally executable method at step 60. Otherwise control passes to decision step 64. Here it is asked whether there is an overriding pragmatic reason for the candidate method to be executed in a specific node. For example, in the Java environment, it is determined whether the candidate is a native and or synchronized method. If so, the candidate method is rejected as a locally executable method at step 60. If not then the candidate method is accepted as a locally executable method at step 66.

The implementation details of the algorithms to determine for a given field whether it is read-locally and for a given method whether it is locally executable are straightforward, and are omitted here in the interest of brevity.

When a class is analyzed, either statically or at run time, one of the rules described above is applied to each of its fields to determine whether it is read-locally. Then for each of the methods in the class a decision is made whether they are locally-executable by analyzing their codes and verifying the conditions stated above.

The run-time support mechanism's goal is to make sure that when a read-locally field is written to, its state is changed from read-only to read-write and that current and future read/write operations will correctly function in a distributed setting. Also all locally executable methods depending on this field lose this locally executable status, and are henceforth executed remotely.

There are four approaches which can be taken by the run time support for determining changes to the status of a field.

(1) In a "per field, per class" approach there is no distinction between the status of fields in different instances of the same class. Namely, different instances of a class all have the same status for their fields.

(2) In a "per field, per instance" object approach an invalidation of a field in one instance, i.e., an object and its set of proxies, does not imply the invalidation of this field in all other instances of the class.

(3) A "per new site" approach implies that objects that are created in the same place in the code will most likely be treated similarly. In this approach there is no distinction between all the fields in this site.

(4) A "per new site, per field" approach is a refinement of the per new site approach. Here only a specific field in all instances in the site loses its read-locally status.

Implementing an exemplary implementation of approaches (3) and (4) involves 2 tables. One table associates the "new" operation with the objects it created at run time. This is preferably realized as a hash table where the key is the address of the "new" bytecode and the data is a list of the objects it created. The second table is also a hash table in which the key is the run time address of the object's handle. This address does not change once assigned. The data of the second table is a pointer to the first table. Thus if a field of an object A is invalidated, using the second table, one can "walk" from the object to the list of all other objects created by the same "new" operation which is found in the first table. The other objects can then be invalidated.

The advantage of the first approach is that the number of classes is bounded by the size of the code. The advantage of the last two approaches is that the number of new sites is bounded by the size of the program. This is in contrast with the second approach where the number of instances that are created at runtime is unbounded. The per field, per class approach is taken in the preferred embodiment of the invention.

The realization of the preferred embodiment of the invention requires the cooperation of the following components and processes.

Analysis

During analysis a particular strategy for determining the read-locally status of fields is applied to the fields of the class, and the information is recorded in data structures associated with the class object. Also methods which are locally executable with respect to some or all fields are identified and recorded. In addition, auxiliary data-structures that are needed to support caching, local execution of locally-executable methods and the field invalidation protocol are created.

Proxy Creation

Since all relevant information is associated with the class structures, i.e., the class-block, no special action has to be taken when an instance of a master object (a master instance object) is created. However, when a proxy of an instance object is created, then any read-locally fields of the class must be cached in the proxy before any attempt is made to use them. For this purpose, values of read-locally fields have to be fetched from the master object or from other proxies which already cached them. Special care has to be taken in this stage since the set of read-locally fields can change dynamically. In actuality, it can only decrease.

As mentioned, it is necessary to cache values of read-locally fields in the data area of the proxy. In general there are three different caching policies: (1) push vs. pull; (2) lazy vs. eager; and (3) shallow vs. deep. However a particular policy can combine aspects of all of these, for example <push,deep>, <pull,eager,shallow>. Not all combinations are valid, and those which are valid differ in the amount of communication done, and the number of additional proxy objects created, if the fields of the object refer to other objects. For example, in the push policy an object is pushed to a node where it may never be accessed, while in the pull policy, the number of messages is increased in case the object contains fields pointing to other objects.

The <pull,lazy,shallow> policy has been found to be most suitable for the applications which have been run. In order to implement the <pull,lazy,shallow> policy, for each object a flag is maintained, which specifies whether values of read-locally fields are cached. When a read, which is a getfield in the Java virtual machine, is performed, first the class is checked whether it has read-locally fields. If so, and if the state is not cached, as indicated by the above mentioned flag, then the state is pulled from the master object.

FIFO Delivery of Consistency Messages

Issues of consistency relating to the invalidation protocol presented below are now discussed.

Consider a field F with the value $V_0$ cached at node N, with its master object located at node M. At a certain point, the old value is invalidated, and a new value $V_1$ is written in the master copy of the field F at the node M. Several messages may take part in the consistency protocol that is invoked: invalidation messages which invalidate cached copies, request messages which ask for copies of fields, and update messages sent in reply to requests, which carry copies of fields to be cached. Suppose the order of messages between the node N and the node M is switched and an update message containing the value $V_1$ reaches the node N before to the message containing the value $V_0$. With this scenario one of the threads at the node N might be reading the value $V_1$ from the field F and afterwards read the value $V_0$. This violates coherence, as in the node M these modifications are seen in a reverse order.

Clearly the problem would be solved by preserving the order of messages which take part in the consistency protocol.

Unfortunately, in an inherently multithreaded environment such as the cluster virtual machine for Java, the network layer, which is unaware of the threads execution sequences, cannot provide such ordering of messages. The network layer is isolated from the run-time system, where the update messages are generated by some "processing layer" which is independent of both and which may delay messages arbitrarily. Hence, even if the network layer provides total ordering of messages, examples such as the above scenario can still happen. The update message carrying the value $V_0$ could be delayed, for example, by an interrupted service thread. Thus the network layer views the update message carrying the value $V_1$ as if it was sent earlier. To solve this problem the cluster virtual machine for Java defines a notion of virtual time through an invalidations-aware FIFO protocol, as is now briefly described.

Returning to the example above, suppose that the field F is a member of an object O. The FIFO protocol lets the nodes M and N maintain counters (per object instance) for the number of invalidations that were applied to the object O. These counters are incremented with each new invalidation. The node M attaches such a counter to all consistency-related messages. If the node N receives a consistency message for the object O with an attached counter that is larger than its local counter, it stores this message until the counters are equal, unless the message indicates the next invalidation. Suppose the node N gets a consistency-related message with an attached counter that is smaller than the locally stored one, then the node N may deduce that this message carries an older value. Since "newer" invalidation messages that have already arrived must have carried values that are possibly newer, but surely not older, the node N safely discards the message.

Note that the definition of FIFO allows for consistency messages to be received "out of order" between two successive invalidation messages, as they will be carrying the same counter. In fact, because invalidations are rare, and since the network is fast relative to the message creation rate, the messages received out-of-order which would require some buffer manipulation effectively never happen; hence the penalty imposed by the FIFO mechanism is negligible.

Invalidation

A read-locally field in a class is invalidated when a write, a putfield in the Java virtual machine, is attempted against the master object or one of its surrogates (proxies). Details for invalidation of cached arrays and final static fields, as well as messaging details have been disclosed above.

A locally executable method is invalidated if at least one if the fields in its read-locally fields set is invalidated.

The invalidation protocol is more formally stated as follows in the pseudocode fragments shown in Listings 5–8. In these listings we assume total order of messages as assured by the FIFO message counter described above.:

Listing 5

Handling a write against a read-locally field:
1. Send an invalidate_1 message request to the node that holds the master class object. Include in the message: the id of the class and its name; the index of the field and its name; and the executing thread's id.
2. Wait for an ack_invalidate_1 message.
3. Write the value to the master object.

Listing 6
Invalidation of a Field and its Dependent methods:
If the class is loaded on this node: {
 1. For every entry in the dependent method list, set it to use the remote stub code and unset the locally-executable bit.
 Otherwise: {
 2. Keep the name of the field in a list for this class in an invalidations table. }

Listing 7

Handling an invalidate_1 message request in the node that holds the master of the class object:
1. lock(class_field_invalidation)
 Note://field invalidations in a node are sequential per class
2. Broadcast an invalidate_2 message request to all the nodes except to this node. Include in the message: the id of the class and its name; the index of the field and its name; and the executing thread's id.
3. Invalidate field and dependent methods.
4. Wait for an ack_invalidate_2 message from all other nodes.
5. Send an ack_invalidate_1 message to the requesting thread.
6. unlock(class_field_invalidation)

Listing 8

Handling an invalidate_2 message request:
1. lock(class_field_invalidation)
2. Invalidate field and dependent methods (see below).
3. Send an ack_invalidate_2 message to the requesting thread.
4. unlock(class_field_invalidation).

Figure 8:
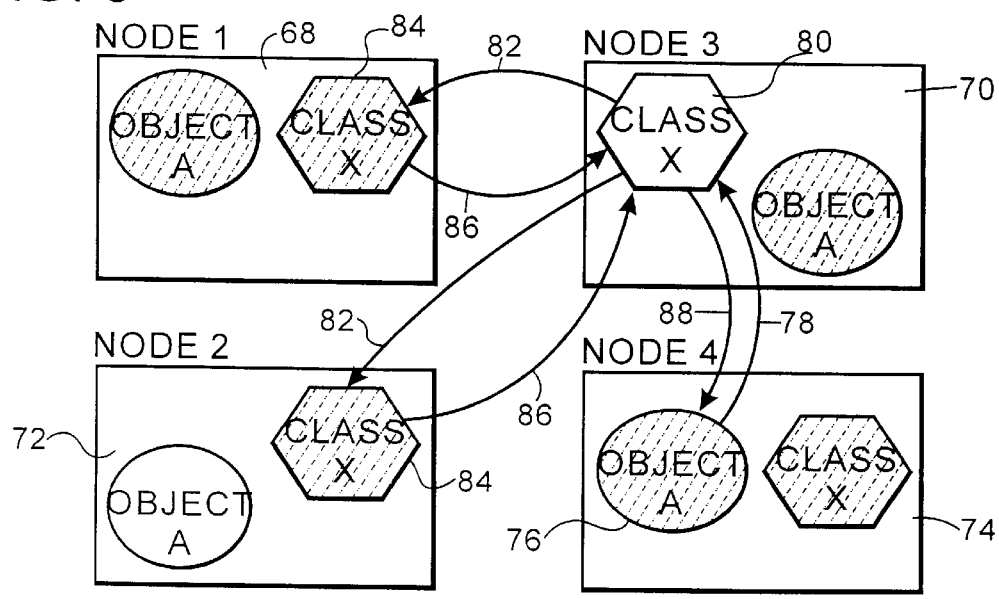
FIG. 8 graphically illustrates operation of an invalidation program according to a preferred embodiment of the invention.

The operation of the invalidation program is shown graphically with reference to FIG. 8, wherein four nodes 68, 70, 72, 74 are shown, and proxies are indicated as hatched areas. Node 74 initiates the process by executing a write operation on a proxy of object 76. On a channel indicated by line 78 an Invalidate_1 message is sent to the master class object 80, which is found on node 70. Then an Invalidate_2 message is broadcast to node 68 and node 72 on channel 82, directed to proxies 84 of the master class object 80. Next, an Ack_invalidate_2 message is sent on channel 86 to the master class object 80 by node 68 and node 72. Finally an Ack_invalidate_1 message is sent on channel 88 by node 70 to the node 74, the node initiating the write operation. It is not necessary to send the Invalidate_2 message and the Ack_invalidate_2 message to node 74.

In some embodiments the write operation to the master class object 80 is piggy-backed on the Invalidate_1 message, which reduces message traffic.

Proof of Correctness

It will now be shown that the invalidation protocol preserves the Java memory model. Herein are considered all cases of multiple accesses, demonstrating that the order of modifications seen by all threads is identical.

Case 1: a putfield and a getfield operation. If both accesses are to the same field of the same instance then the outcome of the getfield process in the data race can be either the old or new value of the accessed field as indicated in the Java memory model specification. If they target the same field in different instances, then the getfield may be executed remotely if it is performed later than the invalidation. However, whether local or remote, it will yield the same value. If the accesses are to different fields then the two operations are independent.

Case 2: Two putfield operations directed to the same field in different instances. The effect of both putfields on the cached copies is the same as if there were only a single putfield. There will be global invalidation. Thus, the only effect of either putfield operation on the other is a possibly earlier invalidation of its cached copies. This early invalidation does not change the values yielded at the caching nodes, hence modification sequences are preserved in the views of all nodes.

Case 3: Two putfield operations directed to the same field in the same instance. As in cases 1 and 2 above, early invalidation does not create a problem. Whether old and new values could be yielded by successive getfields must be considered. Note that when a new value is read by a thread then global invalidation must have already been completed, and cached copies are no longer available. Thus, successive getfields necessarily yield the same order of modifications as seen at the master node.

Case 4: Two putfield operations to different fields F and F'. The fields F and F' may belong to the same instance, different instances, or even different classes.

Consider two modifications: The value $V_1$. is written to field F which previously contained a value $V_0$, and a value V' is written to the field F' which previously contained the value $V_0'$. Suppose thread T reads the value V1 from the field F, and then it reads the value $V_0'$ from the field F'. Now, if another thread T' may read the value V1' from the field F' and then read the value $V_0$ from the field F, sequential consistency would be violated.

By the properties of the Invalidation Protocol it is known that:

(1) The thread T' reads the field F before the new value of the field F was written at the master node; (2) the modification of the field F completes before the thread T reads the field F; (3) The thread T reads the field F before the new value of the field F' was written at the master node; and (4) the modification of the field F' completes before the thread T' reads the field F. Since this creates an impossible cycle of events, it is proven that all modifications are seen in an identical order everywhere.

Further Implementation Details

Further details of the preferred embodiment of the invention follow. Static analysis is performed during the analysis phase. The advantage of static analysis over an alternative technique, run-time profiling of data is that it does not affect performance. In this context master class objects and proxy class objects are handled similarly and independently. Namely, when creating a proxy class object, read-locally related information is not retrieved from the master class object. Rather, the same analysis is locally performed for the proxy class object. Since fields can be invalidated dynamically at runtime, it is necessary to maintain data coherence between all copies of every class. To this end it is determined which fields currently enjoy the read-locally status. It is also necessary to guarantee that invalidations of fields in a class occur in the same order in all the nodes. When the class is analyzed, the preferred strategy is applied in order to determine which of the fields is read-locally.

A field invalidation in a class might occur before, while, or after a proxy of a class object is loaded. Clearly it can occur only after the master class is loaded. If a field is invalidated, and in a certain node a proxy of a class is not yet loaded, then information on the field is maintained in an auxiliary data structure. When the class is "prepared" (a phase in the class loading mechanism of a Java Virtual Machine), it is updated with the invalidations which already occurred.

When an object is serialized, it is desirable to serialize only the values of fields that are currently read-locally. It should be noted that some of the fields might be inherited. Thus the set of fields that are serialized is a function of the invalidation states of its class and all its superclasses, reflected by their currently read-locally fields. Note that in general, invalidation operations can occur simultaneously. Synchronization of this operation is done using standard techniques from the literature and is not described here since it is outside the scope of this disclosure.

Logic of Read Operation

Figure 9:
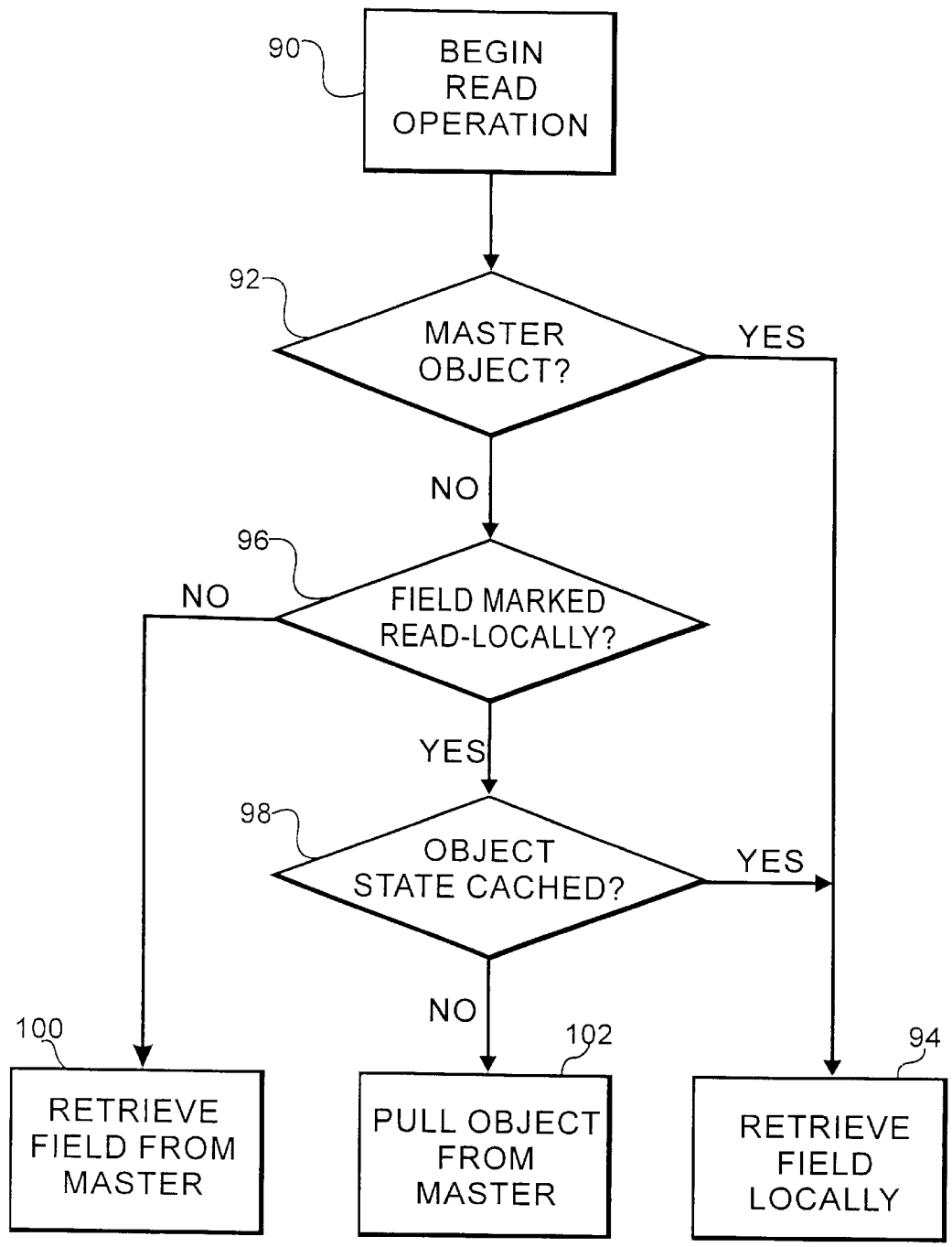
FIG. 9 is a flow chart showing the logic of a read operation on a field of an object according to a preferred embodiment of the invention.

The logic of a read operation on a field of an object is shown with reference to FIG. 9, beginning at step 90. At decision step 92 it is determined whether the object being read is a master object. If so, then the value is retrieved locally at step 94. Otherwise, at decision step 96, if the field is marked as read-locally, then we proceed to decision step 98. If the field is not marked as read-locally then the value is retrieved from the master object at step 100. At decision step 98 a check is made to determine whether the state of the object is cached. If not, the state of the object is pulled from the master at step 102. If the test at decision step 98 is affirmative, then control returns to step 94, and the value is retrieved locally.

Logic of Write Operation

The logic can be simply stated: if the field is read-locally and the object has a global address, then invalidate the field and then write the value to the master object.

It should be noted that a read-locally field must be invalidated even if the write attempt is against a master object. There is no need to invalidate the field if the object does not have a global address. This implies that the object is a master which still does not have any proxies, i.e., the object is not shared.

The next step is to determine, for every method, whether it is locally-executable, by traversing its bytecodes. It is straightforward to determine from the method's bytecodes whether the locally-executable conditions are satisfied. It is assumed here that when a class is loaded the code of all its methods is also loaded, thus the analysis can be done on the proxy class object. Once it is determined that a method is locally-executable it is marked as such. Thus when the method is invoked on a proxy, it is executed locally rather then shipped to the master object. This is preferably achieved using the above noted smart proxy mechanism. It should be noted that it is always possible and correct to execute the master's code on a proxy, since the bytecodes mutating the heap are cluster aware. Thus even if executed on a proxy, the implementation of these bytecodes executes the operation on the master object.

In order to implement method invalidation, there is one more step that is to be taken. A method is invalidated once there is a write to a field that the method accesses. Once a field is invalidated it is necessary to determine which locally-executable methods access it. For this purpose, when analyzing the method's bytecodes, a record is maintained of the fields that are read. With every read-locally field, there is an associated dependent method list which identifies the methods whose locally executable status depend on the field's read-locally status.

Caching of read-only fields is handled according to the pseudo code fragments in Listing 9

---

Listing 9
At requester:
send(pulling_req, <currentNode>, obj_id) message to object's master node
    wait for a response message (fields);
    At master for object:
    pack(&fields, obj_id);
    send (fields) to RequesterNode;

---

Alternate Embodiments

Separating Invalidation From Update

In alternate embodiments of the invention a protocol applicable to read-only in practice fields allows recaching of previously invalidated data. It should be initially noted that the structure of this protocol is restricted by the independence of consistency and synchronization mechanisms in the cluster virtual machine for Java. The reasons for keeping the consistency protocols independent of the synchronization mechanisms are explained below.

The Invalidate-first Observation

Consider the case when a new value is to be stored in a field. Any run-time Java memory model compliant consistency protocol for performing this modification must consist of two phases. It is assumed that the run-time Java memory model is independent of the implementation of monitors, including monitors for objects accessed only by one node. First, a global protocol must complete the invalidation on all nodes. Only then, in a second phase can the modification itself may be carried out at the master node or any of the caching nodes.

Furthermore, the two phase structure for the consistency protocol may also be enforced whenever the protocol is implemented independently of either of the other run-time mechanisms which create messages, such as remote method shipping.

A simplified proof is now presented. Suppose that the consistency protocol is independent of the synchronization mechanism. Consider a field F which is initially $V_0$ and is modified to $V_1$. Suppose that the consistency protocol modifies the field F at a node N before invalidating it on a node M. In other words, on node N, the field F contains $V_1$ while on node M it contains $V_0$. Finally, assume that a thread T at node N reads field F and then unlocks a lock which is subsequently locked by a thread T' at the node M; then the thread T' reads the field F. Since the consistency and synchronization protocols are independent, it is easy to construct a program and a schedule of execution for this scenario, such that the thread T reads the value $V_1$ from the field F while the thread T' reads the value $V_0$. As explained above, this would violate the Java memory model.

In a similar example, a thread may read a field on one node and then apply a method that ships the field to a remote node, where the field has not yet been modified or invalidated.

The invalidate-first observation implies that in a run-time system such as the cluster virtual machine for Java, where the synchronization mechanism and the consistency protocol are independently implemented, modifying a cached field at any node may be done only after invalidating the old copies on all nodes. The reason the cluster virtual machine for Java breaks the link made by the Java virtual machine between synchronization and consistency is to obtain better efficiency. Many synchronization operations (e.g. obtaining a lock on an object used on only one node) that would otherwise require global coordination can now be performed locally.

Invalidate-and-pull Protocol

There is now disclosed an invalidate-and-pull protocol which allows periodic updates to cached mostly-read-only in practice fields in some alternate embodiments of the invention. It would improve efficiency if values could be pushed directly from the modifying node to the caching nodes, without first invalidating. However from the invalidate-first Observation this would violate the Java memory model. In fact, the observation forces the algorithm into two phases: the first phase performs lazy-pull and caching, while the second phase performs global in-validation.

The invalidate protocol given above in the discussion of the first embodiment and the invalidate-and-pull protocol differ, in that the latter allows further caching of instances that are not modified, and future caching of modified instances. This implies that for mostly-read-only in practice fields the invalidation coordinator is the master node of the instance, and not the master node of the class.

In the invalidate-and-pull the modifying node sends an invalidate message to the master node of the object, along with the new value. The master node first disables further replies to request messages, and then initiates an invalidation protocol which is the same as the invalidation protocol of the first embodiment. Once the invalidation protocol completes, the master node modifies the field with the new value, sends an ack message to the modifying node, and, if needed, replies to the queued set of request messages. In the non-master nodes a lazy-pull technique is allowed; it is invoked the next time there is a reference to the invalidated instance object.

Deciding Terminal Invalidation

In some alternate embodiments an additional mechanism is required in order to stop caching a field with too high of a modification rate. Obviously, the benefit of caching is determined by the ratio of the number of reads that in the absence of cached data would become remote compared to the number of invalidation protocols that in the absence of cached data would become simple remote writes. This information is accumulated locally by the proxies. It is piggybacked on the ack messages that are dispatched in response to the invalidation messages and used by the master nodes to determine whether to allow further caching. Terminal invalidation is implemented by executing the invalidate protocol according to the first embodiment via the class master as described above.

The correctness of the invalidate-and-pull protocol is now shown. The protocol is correct regardless of any concurrent synchronization and or remote method shipping operations.

Suppose two getfield operations directed to the same field of a given instance are issued. Then the invalidation-aware FIFO protocol disclosed above insures consistency for the data yielded across all threads in the system.

Suppose a putfield and a getfield operation are issued to the same field instance. If the putfield has already modified the master field, then global invalidation has already completed, so all future accesses will see the new value. If the invalidation did not complete, then the master field was not modified yet, so yielding an old value, for example from a cached copy that was not yet invalidated, is correct.

Suppose two putfield operations are directed to (a) the same or different fields in (b) the same or different instances of (c) the same or different classes are issued. To prove that these modifications are seen in the same order by all the threads it is only necessary to apply the cycle-in-time argument from Case 4 of the proof of the invalidation protocol given in the discussion of the first embodiment.

Comparison of Static Analysis and Data Profiling

To compare the techniques of static analysis against run-time data profiling both techniques were applied to a set of programs. A modified Java virtual machine was used to gather statistics on the number of accesses to each field. Each field was classified according to the number of its mutation at run time. Initialization of the field was treated as the first mutation. The ratio of reads to writes for each field was determined. This information was used to determine which fields should be categorized as execution-time, mostly read only (at $\Phi=10$, i.e., one order of magnitude, where $\Phi$ is the ratio of reads to writes).

A static mutability analysis was performed, using the JAN mutability analyzer, which is described in the document *Sharpening Global Static Analysis to Cope with Java.*, B. M. S. Point and I. Shapira. in Proceedings CA SOON 1998, November 1998. This analysis provide a list of fields which can statically be proven to be read-only. The JAN mutability analyzer allows performing two types of analysis. In a "closed world" analysis 104, all of the program code is available at the time of the analysis. In an "open world' analysis 106, it may be assumed arbitrary that legal new code may be combined with the analyzed code at run-time. Obviously, the latter better reflects reality as it accounts for Java's dynamic nature, while the former allows a larger set of fields to be declared immutable. In the former case, since the entire program is assumed to be available, if the analyzer cannot detect a mutation for a field, it does not need to address the scenario where code may be loaded in the future which will mutate the field.

The results of the static analysis were used to divide those fields which were not mutated at run-time into fields that were execution-time read only and those that were statically read only.

Using the categorization of the fields and the statistics on the number of accesses to each field, the total number of accesses to each category of field was determined for several applications. The analysis was applied to the following well-known programs from SpecJVM98: compress, db, javac, jess, and mtrt. In addition, the analysis was applied to three benchmarks—pBOB, N-Body, and TSP.

Figure 10:
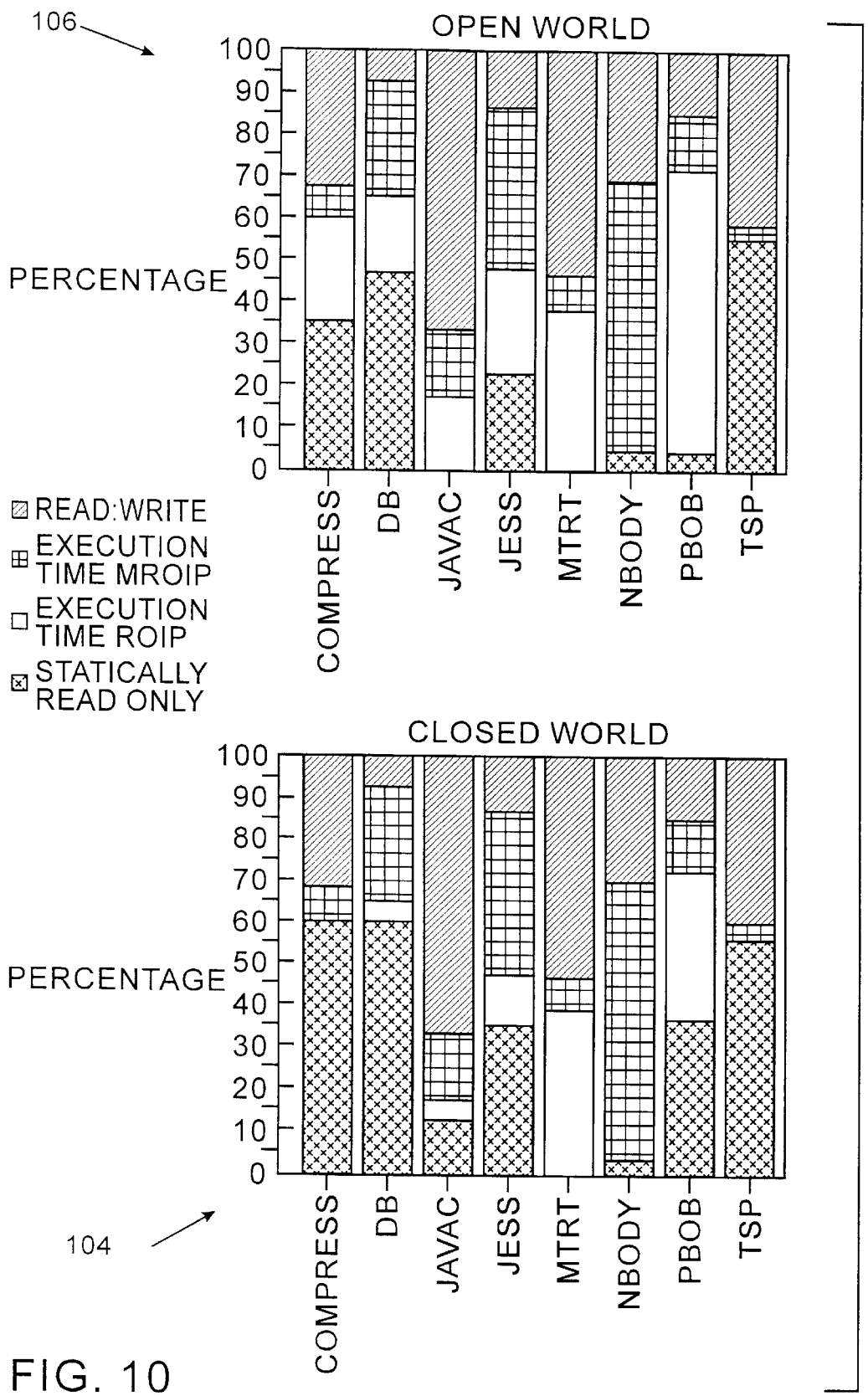
FIG. 10 illustrates static and dynamic analyses of benchmark programs that were tested employing techniques according to the invention.

As shown in FIG. 10 each bar is divided into four categories, as indicated in the key at the left side of the drawing figure: (1) read-write; (2) execution time mostly-read-only in practice; (3) execution time read-only in practice; and (4) statically read-only the bar segments display the percentage of accesses to fields of the given category. It is apparent that in the closed world analysis 104, many more accesses can be categorized as statically read only compared with the open world analysis 106. However, a closed world analysis is in general unrealistic for Java. The motivation for the use of the closed world analysis 104 was to see if there are execution-time read only accesses even in the unrealistic case where all the information is given. Indeed this happens. In the open world analysis 106, while the percentage of accesses to the different categories of fields varies considerably, in all cases a large percentage of accesses are to fields which are execution-time read only or execution-time, mostly read only. This indicates the potential of the read-only in practice and mostly-read-only in practice optimizations.

While the open world analysis 106 and the closed world analysis 104 assist in the understanding that a speculative approach to caching selected fields has a large potential, they are not equivalent to counting those fields that are read-only in practice or mostly-read-only in practice. This is because in these two cases, the behavior is considered only after a datum is accessed from multiple nodes. However, whether a particular datum is accessed on multiple nodes is highly implementation dependent, depending upon such properties as distributed heap management, load balancing, etc. For this reason the analysis was based upon categories of access since this analysis is independent of any particular distributed implementation of a Java virtual machine.

EXAMPLES

In the examples which follow caching of fields was done via lazy pull messages sent to the master objects to retrieve their value. In order for cached fields to be read locally, the cluster virtual machine for Java modified the implementation of all the bytecodes (e.g., getfield, putfield), which access the heap so that they were cluster aware.

The following results were obtained running a cluster virtual machine for Java on one, two and four node clusters of 333 Mhz, IBM Netfinity Intellistations connected via a Myrinet switch, which is described on the World Wide Web site "http://www.myri.com/". The implementation of the cluster virtual machine for Java was based upon the Java C interpreter loop from Sun's JDK 1.2 reference implementation for Windows NT™. The speedups shown are with respect to the cluster virtual machine for Java on a single node. The single node performance of the cluster virtual machine for Java is within a couple of percent of the performance of the reference implementation which was used as the basis for the cluster virtual machine for Java, as was disclosed in the document *Transparently Obtaining Scalability for Java Applications on a Cluster*, Y. Aridor, T. Eilam, M. Factor, A. Schuster, and A. Teperman, Journal of Parallel and Distributed Computing, June, 2000 in JPDC Special Issue on Java Clusters.

All runs for all applications were run using four threads, regardless of the number of cluster nodes. By not allowing any overlap of computation with communication when running on a four node cluster, the understanding of the impact of the optimizations on performance was maximized.

Each application was run on three configurations of the cluster virtual machine for Java: (1) with both read-only in practice and mostly-read-only in practice disabled; (2) with read-only in practice enabled and mostly-read-only in practice disabled; and (3) with both read-only in practice and mostly-read-only in practice enabled. The configuration with mostly-read-only in practice enabled and read-only in practice disabled was not evaluated, since any field that is read-only in practice is also mostly-read-only in practice. In all runs, all of other optimizations used by the cluster virtual machine for Java were enabled. These optimizations are disclosed in the above noted document *Transparently Obtaining Scalability for Java Applications on a Cluster.*

The pBOB benchmark is described more fully in the document *Java server benchmarks*, J. Baylor, et al., IBM System Journal. April 2000. It creates multiple threads which apply transactions in parallel against warehouse which is a composite object. The benchmark measures the throughput (transactions per minute). Each thread operates on its own warehouse. The warehouses are created by the application's main thread, before it creates the threads which apply transactions. Given that pBOB associates a warehouse with a thread via a symbolic name, there is no way to implicitly determine at creation time where to create the warehouses. The cluster virtual machine for Java by default behavior places objects on the node where the operation "new" is executed. Thus, all of the warehouse composite objects are created on the node where the main thread executes.

Since the warehouses are not created on the node where they will be used, a key factor in gaining scalability for pBOB is caching fields of the warehouses to increase the locality between a warehouse and the corresponding thread operating upon it. The cached fields are execution-time, read-only. Some of the fields, e.g., the name and price fields of Item objects, are in an object which is initialized by an "initializer" method. This method is invoked to initialize the object outside of the constructor. Other fields, e.g., the year, month, day fields of java/util/Date objects, can be mutated by public "setter" methods which are never invoked in PBOB. Because these fields are accessed by multiple nodes, the use of read-only in practice caching is beneficial.

Figure 11:
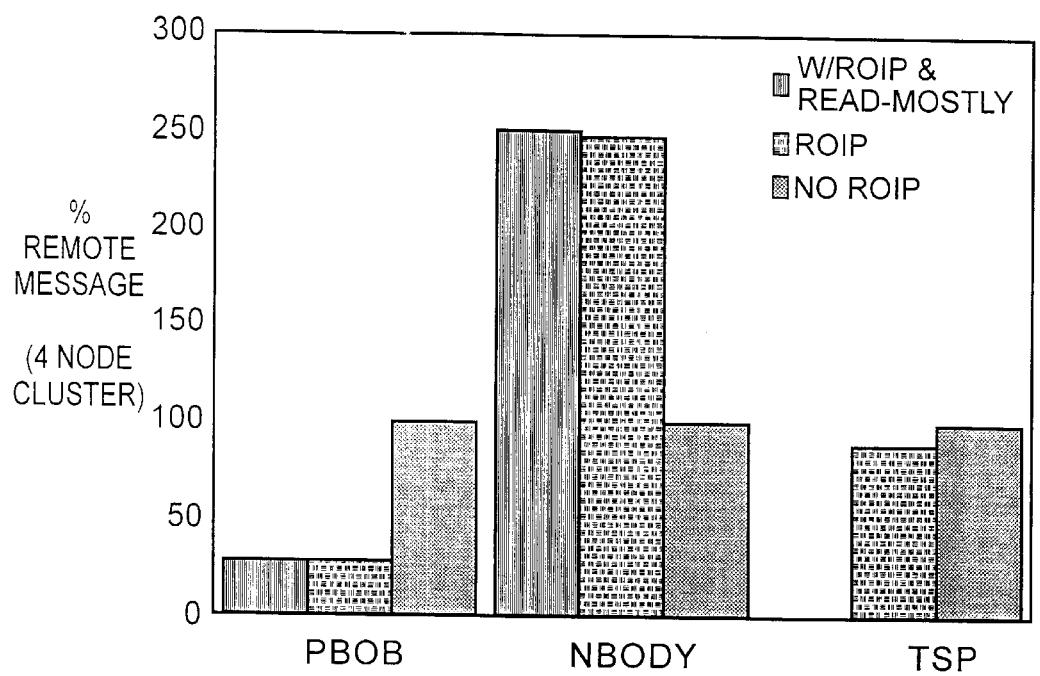
FIG. 11 is a bar chart illustrating the effect of field level caching according to a preferred embodiment of the invention.
Figure 12:
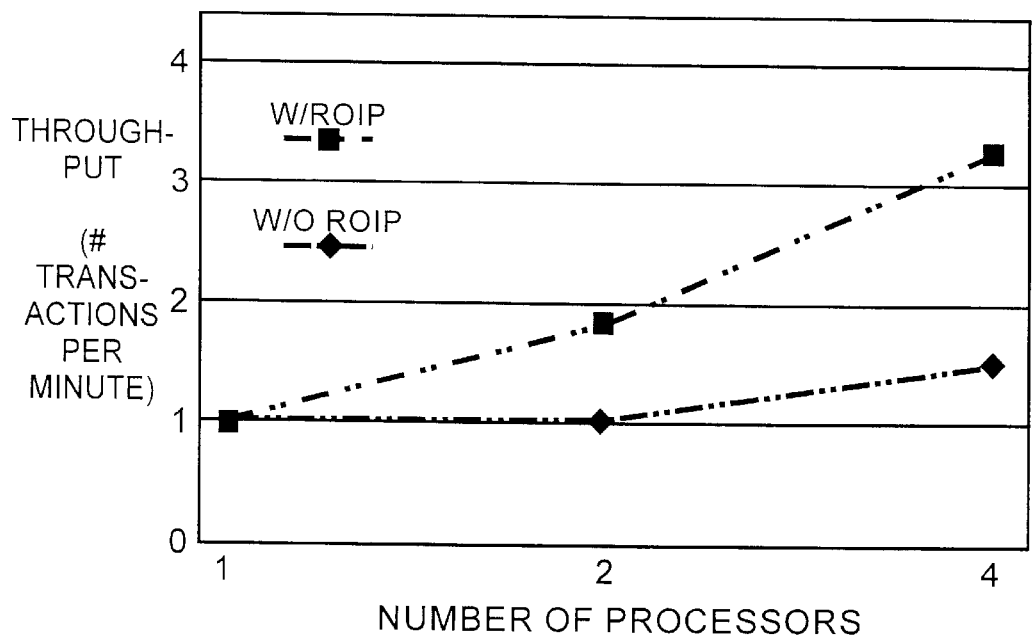
FIG. 12 is a line chart illustrating the effects of all optimizations including field level caching according to a preferred embodiment of the invention as a function of the number of processors in a cluster.

The effect of field-level caching is shown for pBOB on the quantity of remote communication and scalability in FIG. 11 and FIG. 12. FIG. 11 illustrates the number of messages on a four node cluster, normalized to 100 for the case of no read-only in practice fields. The actual number of messages are shown above the bars. A 3.5-fold reduction was observed in the amount of communication and a 2.1-fold increase in throughput due to read-only in practice caching.

In running pBOB on top of the cluster virtual machine for Java implementation, almost no benefit was seen from the use of mostly-read-only in practice fields. This is in spite of the fact that pBOB has a non-trivial number of accesses to fields which are execution-time, and mostly-read-only. The difference is due to the fact that these accesses are to fields which are not shared. Thus there is no opportunity for mostly-read-only in practice caching to provide a benefit. The slightly higher quantity of remote communication shown in FIG. 11 for the combined case of read-only in practice and mostly-read-only in practice is due to the generation of additional update and invalidation messages prior to disabling all caching of the candidates of the mostly-read-only in practice category.

The N-Body program simulates the motion of particles in a two-dimensional space due to gravitational forces, over a predefined number of simulation time steps. This program follows the well known Barnes-Hut algorithm. The program creates a quad-tree which represents the spatial distribution of particles in a two-dimensional space; each node in the tree represents a subspace which contains at least one particle. Next, a computational phase is applied in which the tree is traversed upwards to update every tree node. In this phases each node is updated with information, such as the combined mass of the subspaces represented by its children in the tree. Finally, a force calculation phase is applied in which the tree is traversed downwards, once per particle. This is done by multiple threads, each calculating the forces applied on a different particle. This last phase is the only parallel phase. Over 90% of the CPU time is devoted to the force calculation phase.

Figure 13:
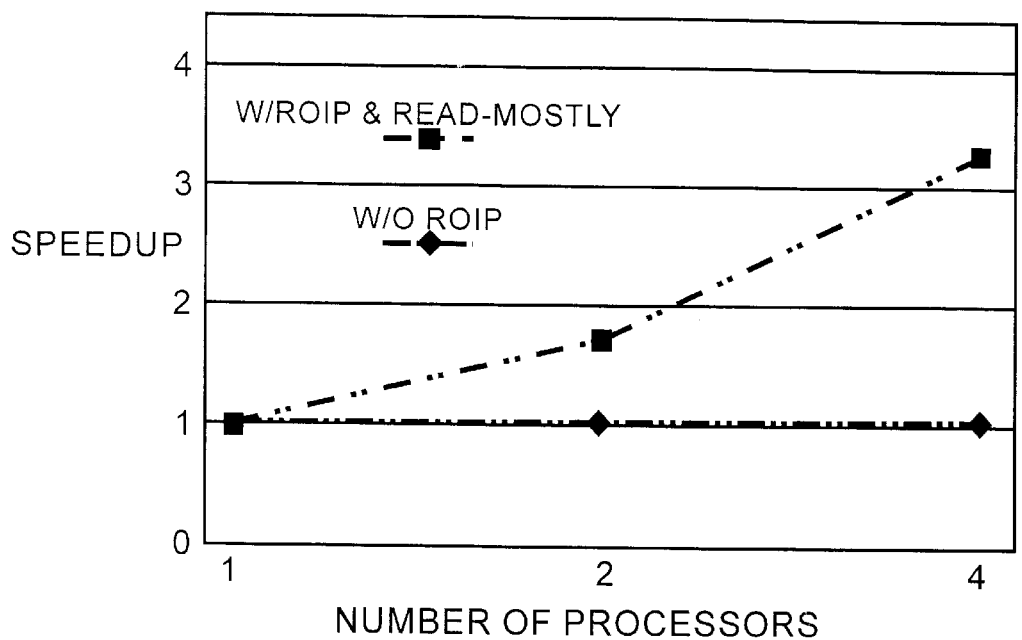
FIG. 13 is a line chart similar to FIG. 12 further illustrating the effects of field level caching according to a preferred embodiment of the invention.

The key factor in scaling the N-Body program on a distributed system is caching fields of the tree nodes in each cluster machine. This allows the fields to be colocated with the threads using their values during the force calculation phase. The effect of caching these fields on the quantity of remote communication and scalability is shown with reference to FIG. 11 and FIG. 13. As with pBOB, the impact of mostly-read-only in practice field caching is negligible.

Figure 14:
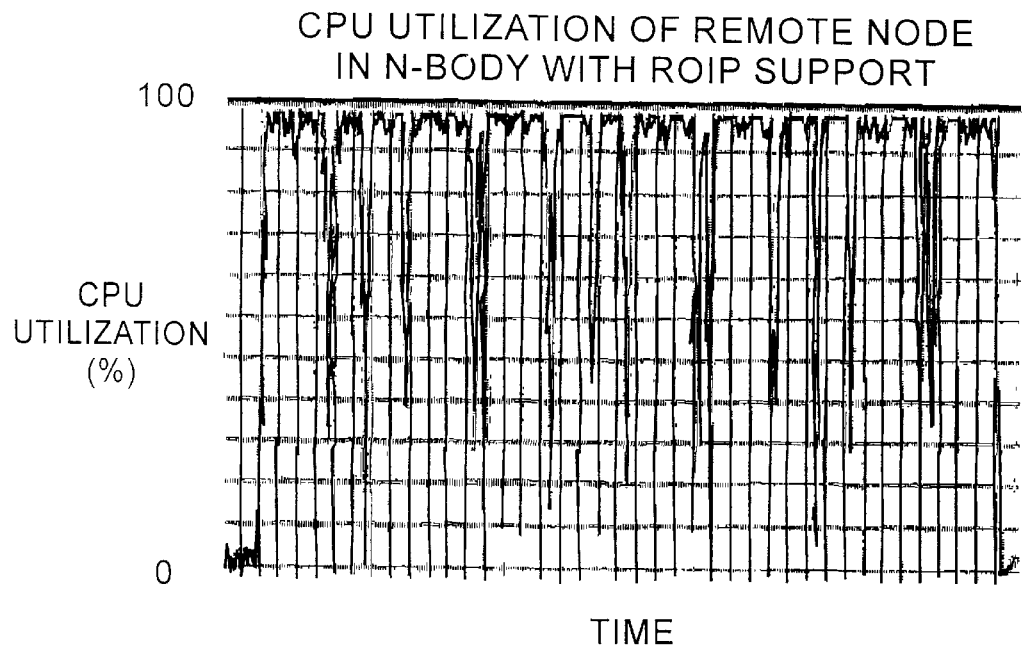
FIG. 14 is a chart illustrating CPU utilization as a function of remote communication traffic in an embodiment of the invention.
Figure 15:
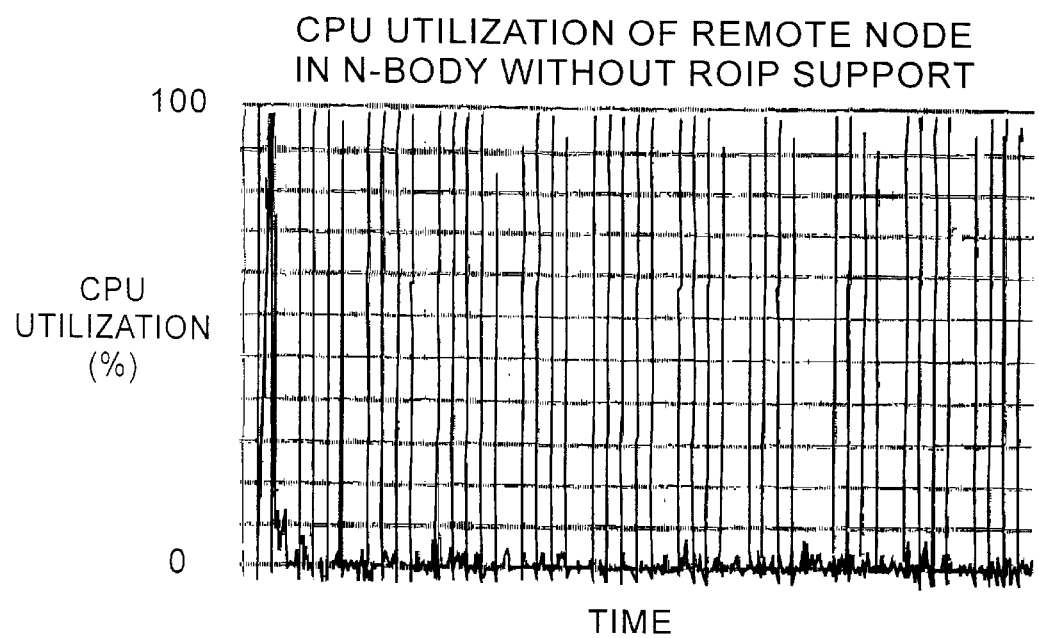
FIG. 15 is a chart similar to FIG. 14.

One interesting observation to note about N-Body is that scalability can be inversely correlated to remote communication. Without caching, when a thread operates on a tree node during the force calculation phase, the computation is brought from the remote node to the node where the tree was built. Therefore, while read-only in practice caching results in a large number of remote messages in order to pull the remote object's fields, it allows each thread to locally apply the force calculation on cached copies, resulting in significantly better CPU utilization. This is shown in FIG. 14 and FIG. 15, which respectively show the average CPU utilization of a remote node with and without read-only in practice caching. Specifically with read-only in practice caching, as FIG. 14 shows, except for very short intervals when the algorithm is executing its serial phases, or when the remote node is pulling objects at the beginning of each simulation step, or when the stop-the-world garbage collector is executing, CPU utilization is close to 100%.

The benchmark TSP is a parallel, branch-and-bound implementation of the well-known traveling salesman program. This program finds the shortest route among a set of cities with predefined distances between them. The program tries all combinations of routes, cutting off the examination of a particular route as soon as it is longer than the best route found so far.

In this algorithm, the length of possible routes was calculated in parallel. The program maintains good load-balancing by using local queues which save future work (routes whose lengths should be computed). Once a thread become idle, it checks its local work queue as well as the queues of the other threads to steal a new work. Due to implicit object migration in the cluster virtual machine for Java work stolen from a remote queue is migrated to the target node and is accessed locally, as if it were generated locally.

Figure 16:
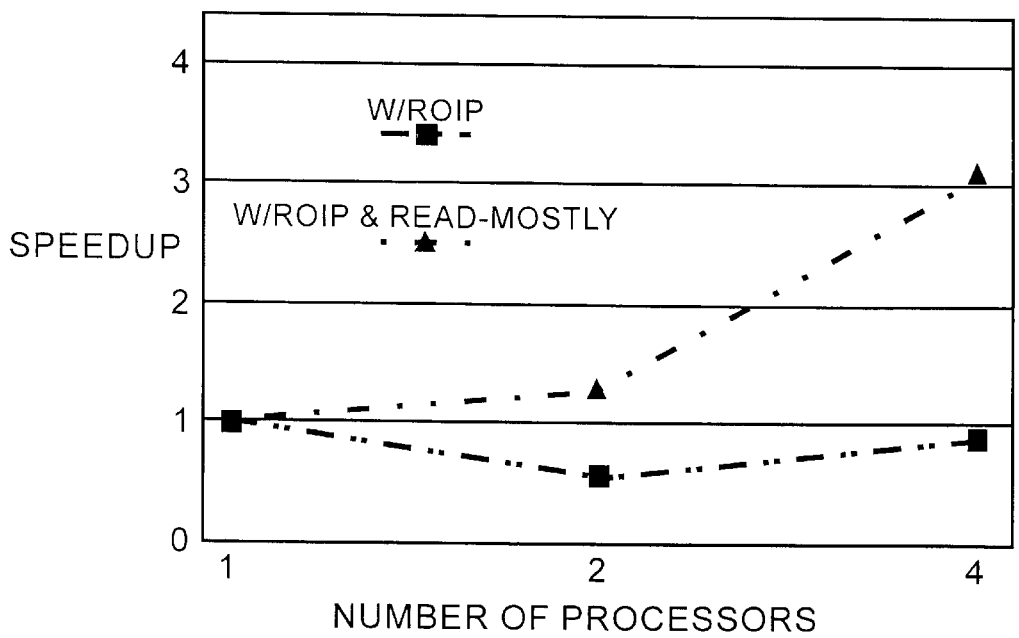
FIG. 16 is a chart similar to FIG. 13 showing the effect of field caching on remote communication according to a preferred embodiment of the invention.

In practice, there is only a single shared object in the program. This object represents the shortest route found so far. One of its fields is the length of that route. Upon calculating a route, if its predicted length (the sum of the length of the partial route already checked and a lower bound for the length of the rest of this route), exceeds the length of the shortest route found so far, the calculation of the route is terminated. This field, which holds the shortest route found so far, benefits significantly from mostly-read-only in practice caching, as it is an execution-time, mostly read-only field. The field is only updated when a new best route is found. Caching this field significantly reduces the amount of remote communication and the scalability as shown in FIG. 11 and FIG. 16, respectively. While the speedup on two nodes is fairly poor, super-linear speedup is achieved when moving from two nodes to four nodes, as expected with parallel branch-and bound algorithms.

Unlike the other benchmarks, read-only in practice caching has very little impact on the benchmark TSP. However, because there are few accesses it comes as surprise to fail to see significant benefit from read-only in practice caching in the benchmark TSP.

Additional Optimizations

A description of the additional optimizations employed in the above examples, is now given. A full discussion is found in the above noted Aridor et. al publication, which is herein incorporated by reference. The additional optimization can be employed in many combinations with the field caching techniques disclosed hereinabove to obtain a desired level of system performance.

Method Invocation Optimization

As a general rule, the cluster virtual machine for Java executes methods on the node holding the master copy of the target of the method invocation. This is aimed at improving locality under the assumption that a method will generally access its target object.

Sometimes, however, this rule does not make sense. This is particularly true when it is known or suspected, that any data the method needs will be located on the node where the method is invoked.

In the cluster virtual machine for Java there are different optimizations which aim at handling special cases where it does not make sense to remotely invoke a method. These optimizations are aimed at class methods, stateless instance methods and locally executable methods. All of these are methods whose local invocation is based on the caching of read-only in practice fields.

Each of these categories are described below.

Invocation of Class Methods

Class methods (also named static methods) are methods of the class rather than of its instances. Usually these methods use the static fields of the class. Since the cluster virtual machine for Java caches static fields with class proxies, performance is gained by executing these methods locally even though the master class object is on another node.

Consider the following two extreme cases. In one, all static fields are cached and in the second none of the static fields are cached since they have been invalidated. In the first case, the cluster virtual machine for Java definitely gains performance by replacing a remote invocation with a local one. In the second case, there is semantic correctness since field access operations are cluster aware, but performance can be degraded since one remote invocation and many local field accesses are replaced with a local invocation with many remote field access.

As static fields are mostly read-only, by invoking class methods locally performance is gained, except in extreme cases. The impact of this optimization in isolation is shown in line five of Table 1 As can be seen, using this optimization (in concert with caching of static variables) reduces the cost of a static method invocation on a proxy class so that it is only slightly higher than the cost of a local invocation.

Invocation of Instance Stateless Methods

Some methods work only on the local thread's stack. For example, the java/lang/Math.min(a,b) method accepts two integer parameters and returns the smaller one. Such methods are termed stateless, since they do not access the heap. The cluster virtual machine for Java uses a load time analysis to detect such methods by checking that the method works only on the stack, and is not synchronized or native, and marks them as stateless. When a stateless method is invoked on a proxy it is always executed locally by the cluster virtual machine for Java since it never accesses the heap. Line six of Table 1 shows that this optimization is effective in reducing the cost of invocations for stateless methods.

Invocation of Locally-executable Methods

Methods which have no heap accesses other than to cached fields of their target object can be executed locally since all of their data is cached on this node. Once fields are marked as read-locally, the cluster virtual machine for Java determines that a method is locally-executable if all of the following conditions are satisfied. (1) It is not native, synchronized or static. (2) It does not perform a putfield operation. (3) It does not perform a getfield operation against a field which is not read-only or read-locally. (4) It does not perform a getfield against a field which is not defined in the method's class. Item (4) is a technical requirement which avoids resolving any constant pool item too soon. (5) It does not invoke any other method.

The invalidation process for read locally fields also needs to invalidate the locally executable methods which access the field being invalidated. To enable this process, for each read locally field a record is maintained as to which methods access such fields. Thus, it is straight-forward to invalidate the locally executable methods.

Object Placement Optimizations

This class of optimizations places the master copy of an object where it will be used and not where it is created. In the preferred embodiment of the invention this is done for objects other than threads.

Two heuristic optimizations that focus on object placement are implemented. The first, factory methods, is aimed at improving support for objects created via an object factory, as opposed to a direct invocation of the method "new" in the method that requires the object. The basic idea of this optimization is to always ensure that the object returned by a factory method has its master copy on the node where the object will be used. In the second optimization, "single chance", objects are migrated. These are objects whose usage pattern has one thread creating and initializing the object, and exactly one other thread using the object, with no overlap between the two threads.

Factory Methods

A factory method creates an object which it returns. Such methods are associated with a common software design pattern of the same name. Factory methods can be either instance methods, often combined with the singleton design pattern, or static methods. Without special handling, factory methods can cause poor performance in a distributed implementation of an object oriented system such as the cluster virtual machine for Java.

As used herein, factory methods include methods which contain calls to a factory method. In other words, a factory method is one which either: (1) returns an object it creates, or (2) returns an object it received as the result of a call to a factory method.

The cluster virtual machine for Java uses a simple heuristic to identify factory methods. This heuristic performs a simple, flow-insensitive, non-conservative analysis of the bytecodes of each method when the code for the various smart proxies is constructed. This analysis is applied to non-native, non-synchronized methods which return objects. Native and synchronized methods are ignored, since they must be executed on the master's nodes. Listing 10 indicates a static analysis for the identification of factory methods.

```
                         Listing 10
    for each opcode in the method {
           opcode current opcode being processed
                 next_opcode = next opcode in sequential order
    if (next_opcode == store to variable returned by method)
       {
       if ((opcode == aconst_null) || (opcode == new) ||
          (opcode == anewarray) || (opcode == opc_newarray))
{
                         continue;
       } else if ((opcode == invokespecial) (opcode == in-
          vokevirtual) (opcode == invokestatic) (opcode == in-
          vokeinterface)) {
              char *methodname == name of the method being in-
                 voked;
              char *signature == signature of the method being
                 invoked;
              if ((opcode == invokespecial &&
                    (strcmp(methodname, "<init>") == 0))) {
              // calling a constructor
              // Assume the common code idiom of duplicating
                    the reference
              // to the newly created object, calling the con-
                    structor and
              //then storing the reference to the new object.
       } else if (returnTypeIsObject(signature) && isA-
          FactoryMethod (methodname))
                         continue;
             } else {
       return NOT_A_FACTORY_METHOD;
       }
             } else {
       return NOT_A_FACTORY_METHOD;
             }
             } else {
             continue;
             }
       return IS_A_FACTORY_METHOD;
             }
```

Single Chance Migration

The single chance migration optimization is a heuristic attempt to support a usage pattern in which an object goes through two non-overlapping phases, where in each phase only a single thread uses the object. One concrete example of such a usage pattern is when there is one thread which performs setup for the other threads. The latter begin executing after the setup is completed. One key point to note about this usage pattern is that there is no sharing of the object. At any point in time, no more than one thread is actively using the object.

Single chance migration is a speculative optimization which guesses that an object fits the design pattern, and migrates the object to the node where the object will be used in the second phase of its life. In some embodiments of the invention, if it is determined that objects of a particular class do not fit this pattern, e.g., the object is concurrently accessed by two nodes, or it is used by more than two nodes during its life, this optimization is disabled for the class.

The single chance migration optimization involves the following elements: (1) statically identify classes whose instances may be candidates for this optimization; (2) dynamically prune the list of classes by detecting objects which are shared by threads on different nodes; (3) detect when the return of a proxy for an object that is of a class whose instances are eligible for this optimization; and (4) migrate the object from the node where it was created to the node where the thread that is using the object is executing.

It is desired to migrate only those objects whose code is relatively encapsulated, i.e., not too dependent upon other objects which may be left behind on the node where the object was created. When the code is loaded, a simple analysis is performed to determine if a class's code is relatively encapsulated. If the class contains a method which uses an unencapsulated array then the class is not relatively encapsulated. There is a focus on arrays in the analysis, since using an array often involves a large number of memory accesses, e.g., iterating through the array elements. In addition, accesses to encapsulated arrays are ignored, since these arrays can be easily migrated along with their containing object. Objects with application-defined native methods are not migrated, because there is no way of migrating or even detecting any native state that may be used by these methods. In addition, objects which are cached are not migrated. Classes whose instances are not migrated are marked as ineligible for this optimization.

Objects belonging to classes which have not been marked as ineligible are candidates for migration. The list of candidates is refined at run-time by detecting objects which are shared. More precisely, if there is an attempt to send a message which includes an object that has been migrated, migration of all instances of the object's class is stopped by marking the class as ineligible. Using these techniques, a refined list is correlated which accurately reflects the usage of objects by the program.

According to some preferred embodiments of the invention, migration is performed on demand. The process starts when a node receives an object that it has never seen in the response to a remote request. The node then determines whether the object's class is eligible for migration. If so, it sends a message to the master node for the object which must be the node which sent the message containing the global address of the object requesting that the object be migrated.

TABLE 2

| Target Node | Source Node |
|---|---|
| Create a place holder for object and mark as Quasi-Master | |
| Give the place holder a new global address | |
| Request the state of the object from the Source | |
| send place holder's global address | |

TABLE 2-continued

| Target Node | Source Node |
| --- | --- |
| | Receive a request to transfer state of object |
| | Mark object as In transit (instead of master) and set the object to have the global address received from the target |
| | Copy object's state into a buffer to send to the target (preferably a shallow copy) |
| | Send the state to the target |
| Receive the state of the object from the Source | |
| Deserialize the state of the object into the place holder | |
| Mark the place holder as a normal Master allowing all operations on the object to proceed. | |

The simple part of migrating an object is transferring the object's state. The protocol for migrating an object's state is shown in Table 2 where the source is the node containing the original master of the object and the target is the node to which the object is being migrated. The hard part of migrating an object is handling the race that can occur if the object is shared and the state of the object is modified on the source node while the state is being copied. This is hard since it is undesirable to use a lock to synchronize between all writes to the state of an object (i.e., all putfield bytecodes) and copying an object's state for purposes of migration.

Instead of synchronizing all writes to a class, a two-phase approach is employed, which combines inexpensive detection of a race and a fix-up algorithm, which is briefly presented. There is a concern that a putfield bytecode could be executed against the object that is migrating while the object's state is being copied. To cluster-enable the heap access bytecodes, a write barrier is added, which determines whether or not the write should occur locally or should be transferred to another node containing the master of the object. The basic flow of this code is shown in Listing 11.

```
                        Listing 11
if (cJVM__isMaster(o)) {
    perform a local modification
} else {
    send a message to execute a remote bytecode
}
``` where o is the object that is the target of the putfield.

A problem occurs if the thread that received the request to migrate the object marks the object as in transit between the time that the thread executing the putfield sees that the object is a master, and the time it performs the local modification. In this case, it is possible that the actual memory modification occurs after the given field of the object's state has been copied. This would lead to the putfield being lost, as the state of the object is copied to the target would not contain its effect.

To solve this race issue a two part scheme is used: detection and correction. To detect the race, an additional check is added, as to whether the object is a master after the local modification as shown in Listing 12

```
                        Listing 12
if (cJVM__isMaster(o)) {
    perform a local modification
    if (!cJVM__isMaster(o)) {
        a race detected
    }
} else {
    send a message to execute a remote bytecode
}
```

If the object is no longer a master then a race has occurred, although it is not known whether the copy of the state contains the value written to memory. If the object is still a master, then no race has occurred.

While this invention has been explained with reference to the structure disclosed herein, it is not confined to the details set forth. The preferred embodiments of the invention are implemented using Java, but it will be apparent to those skilled in the art that the teachings herein can be applied to other dynamic languages without departing from the spirit of the invention. This application is intended to cover any modifications and changes as may come within the scope of the following claims:

What is claimed is:

1. A method of distributed computing, comprising the steps of:

executing Threads of an application in a plurality of interconnected nodes in a network allocating memory of said nodes to Java compatible data objects;

responsive to said step of allocating memory for one of said Java compatible data objects, applying a predefined set of criteria to individual fields of said one Java compatible data object;

selecting read-locally fields from said individual fields according to said predefined set of criteria;

caching said read-locally fields in a cache of at least one of said nodes to define cached instances of said read-locally fields, performance fo said step of caching being transparent to said application; and fetching at least one of said cached instances of said read-locally fields from said cache during execution of one of said threads by a proxy that is associated with said cache.

2. The method according claim 1, wherein said step of selecting is performed by:

initializing said individual fields; and speculatively applying said predefined set of criteria prior to said steps of caching and fetching.

3. The method according claim 1, wherein said predefined set of criteria comprises field encapsulation in a code of said application.

4. The method according claim 1, wherein said predefined set of criteria comprises field encapsulation in a library code used by said application.

5. The method according claim 1, wherein said predefined set of criteria comprises a programmer-provided indication.

6. The method according claim 1, wherein a candidate is selected from said individual fields according to a subset of said predefined set of criteria.

7. The method according to claim 1, further comprising the steps of:
   mutating one of said cached instances in one of said nodes; and
   responsive to said step of mutating, invalidating all of said cached instances of said one cached field to define an invalidated cache field.

8. The method according to claim 7, further comprising the steps of:
   following said step of invalidating, modifying one of said individual fields, said one individual field corresponding to said one cached field in a master node of said nodes, to define a modified individual field;
   notifying said nodes of said of modifying;
   referencing said invalidated cache field in a referencing node of said nodes; and
   thereafter transmitting said modified individual field from said master node to said referencing node.

9. The method according to claim 1, further comprising the steps of:
   identifying a method of said application that accesses fields of said Java compatible data objects that are limited to said read locally fields define a locally executable method;
   executing said locally executable method on one of said nodes, wherein said read-locally fields that are accessed by said locally executable method are fetched from said cache of said one node.

10. The method according to claim 9, further comprising the steps of:
    mutating one of said read-locally fields that is accessed by said locally executable method; and
    responsive to said step of mutating, invalidating all said cached instances of said one read-locally field;
    invalidating said locally executable method to define an invalidated method, wherein said invalidated method subsequently executes on another of said nodes.

11. The method according to claim 1, wherein said Java compatible data object comprise a class having objects allocated in one of said nodes, further comprising the steps of:
    mutating one of said read-locally fields in one of said objects of said class;
    responsive to said step of mutating, invalidating all of said read-locally fields of all of said objects of said class in said one node.

12. The method according to claim 1, wherein said Java compatible data objects comprise a class having objects allocated in one of said nodes, and further comprising the steps of:
    mutating one of said read-locally fields in one of said objects of said class;
    responsive to said step of mutating, invalidating said one read-locally field in all of said objects of said class in said one node.

13. The method according to claim 1, wherein said Java compatible data objects comprise a class having objects allocated in one of said nodes, and further comprising the steps of:
    mutating one of said read-locally fields in one of said objects of said class;
    responsive to said step of mutating, invalidating said one read-locally field in all said objects of said class in said nodes.

14. The method according to claim 1, wherein execution of said threads of said application is performed using a Java virtual machine.

15. The method according to claim 14, wherein said Java virtual machine is a cluster virtual machine for Java.

16. A computer software product, comprising a computer-readable medium in which computer program instructions are stored, which instructions, when read by a computer, cause the computer to perform the steps of:
    executing threads of an application on a plurality of interconnected nodes in a network; allocating memory of said nodes to Java compatible data objects;
    responsive to said step of limiting memory for one of said Java compatible data objects, applying a predefined set of criteria to individual fields of said one Java compatible data object;
    selecting read-locally fields from said individual fields according to said predefined set of criteria;
    caching said read-locally fields in a cache of at least one of said nodes to define cached instances of said read-locally fields, performance of said step of caching being transparent to said application; and
    fetching at least one of said cached instances of said read-locally fields from said cache during execution of one of said threads by a proxy that is associated with said cache.

17. The computer software product according to claim 16, wherein said step of selecting is performed by:
    initializing said individual fields; and
    speculatively applying said predefined set of criteria prior to said steps of caching and fetching.

18. The computer software product according to claim 16, wherein said predefined set of criteria comprises field encapsulation in a code of said application.

19. The computer software product according to claim 16, wherein said predefined set of criteria comprises field encapsulation in a library code used by said application.

20. The computer software product according to claim 16, wherein said predefined set of criteria comprises a programmer-provided indication.

21. The computer software according to claim 16, wherein a candidate is selected from said individual fields according to a subset of said predefined set of criteria.

22. The computer software product according to claim 16, further comprising the steps of:
    mutating one of said cached instances in one of said nodes; and
    responsive to said step of mutating, invalidating all said cached instances of said one cached field to define an invalidated cache field.

23. The computer software product according to claim 22, further comprising the steps of:
    following said step of invalidating, modifying one of said individual fields, said one individual field corresponding to said one cached field a master node of said nodes, to define a modified individual field;
    notifying said nodes of said step of modifying,
    referencing said invalidated cache field in a referencing node of said nodes; and
    thereafter transmitting said modified individual field from said master node to said referencing node.

24. The computer software product according to claim 16, further comprising the steps of:
    identifying a method of said application that accesses said individual fields that are limited to said read locally fields to define a locally executable method;

executing said locally executable method on one of said nodes, wherein said read-locally fields that are accessed by said locally executable method are fetched from said cache of said one node.

25. The computer software product according to claim 24, further comprising the steps of:
   mutating one of said read-locally fields that is accessed by said locally executable method; and
   responsive to said step of mutating, invalidating all said cached instances of said one read-locally field;
   invalidating said locally executable method to define an invalidated method, wherein said invalidated method subsequently executes on another of said nodes.

26. The computer software product according to claim 16, wherein said Java compatible data objects comprise a class having objects allocated in one of said nodes, further comprising the steps of:
   mutating one of said read-locally fields in one of said objects of said class;
   responsive to said step of mutating, invalidating all of said read-locally fields of all of said objects of said class in said one node.

27. The computer software product according to claim 16, wherein said Java compatible data objects comprise a class having objects allocated in one of said nodes, and further comprising the steps of:
   mutating one of said read-locally fields in one of said objects of said class;
   responsive to said step of mutating, invalidating said one read-locally field in all of said objects of said class in said one node.

28. The compute software product according to claim 16, wherein said Java compatible data objects comprise a class having objects allocated in one of said nodes, and further comprising the steps of:
   mutating one of said read-locally fields in one of said objects of said class;
   responsive to said step of mutating, invalidating said one read-locally field in all said objects of said class in said nodes.

29. The computer software not according to claim 16, wherein execution of said threads of said application is performed using a Java virtual machine.

30. The computer software product according to claim 29, wherein said Java virtual machine is a cluster virtual machine for Java.

31. A distributed computing system, comprising:
   a plurality of processing units interconnected in a network;
   a runtime support program installed in at least one of said processing units and directing said processing units, wherein said processing units execute threads of an application, and responsive to program instructions of said application, said time support program transparently causes said processing units to execute the steps of:
      allocating a portion of a memory to a Java compatible data object;
      responsive to said step of allocating, applying a predefined set of criteria to individual fields of said Java compatible data object;
      selecting read-locally fields from said individual fields according to said predefined set of criteria;
      caching said read-locally fields in a cache of at least one of said processing units to define cached instances of said read-locally fields; and
      fetching at least one of said cached instances of said read-locally fields from said cache during execution of one of said threads by said one processing unit.

32. The system according to claim 31, wherein said step of selecting is performed by:
   initializing said individual field; and
   speculatively applying said predefined set of criteria prior to said steps of caching and fetching.

33. The system according to claim 31, wherein said predefined set of criteria comprises field encapsulation in a code of said application.

34. The system according to claim 31, wherein said predefined set of criteria comprises field encapsulation in a library code used by said application.

35. The system according to claim 31, wherein said predefined set of criteria comprises a programmer-provided indication.

36. The system according to claim 31, wherein a candidate is selected from said individual fields according to a subset of said predefined set of criteria.

37. The system according to claim 31, wherein said runtime support program transparently causes said processing units to execute the further steps of:
   mutating one of said cached instances in one of said processing units; and
   responsive to said step of mutating, invalidating all of said cached instances of said one cached field to define an invalidated cache field.

38. The system according to claim 37, wherein said runtime support program transparently causes said processing units to execute the further steps of:
   following said step of invalidating, modifying one of said individual fields, said one individual field corresponding to said one cached field in a master processing unit of said network, to define a modified individual field;
   notifying said processing units of said step of modifying;
   referencing said invalidated cache field in a referencing processing unit of said network; and
   thereafter transmitting said modified individual field from said master processing unit to said referencing processing unit.

39. The system according to claim 31, wherein said runtime support program transparently causes said processing units to execute the further steps of:
   identifying a method of said application that accesses fields of said Java compatible data object that are limited to said read locally fields define a locally executable method;
   executing said locally executable method on one of said processing units, wherein said read-locally fields that are accessed by said locally executable method are fetched from said cache of said one processing unit.

40. The system according to claim 39, wherein said runtime support program transparently causes said processing its to execute the further steps of:
   mutating one of said read-locally by fields that is accessed by said locally executable method; and
   responsive to said step of mutating, invalidating all said cached instances of said one read-locally field;
   invalidating said locally executable method to define an invalidated method, wherein said invalidated method subsequently executes on another of said processing units.

41. The system according to claim 31, wherein said Java compatible data object comprises a class having objects allocated in one of said processing units, wherein said runtime support program transparently causes said processing units to execute the further steps of:
   mutating one of said read-locally fields in one of said objects of said class;
   responsive to said step of mutating, invalidating all of said read-locally fields of all of said objects of said class in said one processing unit.

42. The system according to claim 31, wherein said Java compatible data object comprises a class having objects allocated in one of said processing units, wherein said runtime support program transparently causes said processing units to execute the further steps of:
   mutating one of said read-locally fields in one of said objects of said class;
   responsive to said step of mutating, invalidating said one read-locally field in all of said objects of said class in said one processing unit.

43. The system according to claim 31, wherein said Java compatible data object comprises a class having objects all in one of said processing units, wherein said runtime support program transparently causes said processing units to execute the further steps of:
   mutating one of said read-locally fields in one of said objects of said class;
   responsive to said step of mutating, invalidating said one read-locally field in all said objects of said class in said processing units.

44. The system according to claim 31 wherein said runtime support program comprises a Java virtual machine.

45. The system according to claim 44, wherein said Java virtual machine is a cluster virtual machine for Java.

* * * * *